(12) United States Patent
Namata et al.

(10) Patent No.: US 8,879,016 B2
(45) Date of Patent: Nov. 4, 2014

(54) COLOR FILTERLESS DISPLAY DEVICE, OPTICAL ELEMENT, AND MANUFACTURE

(75) Inventors: Hidetoshi Namata, Kanagawa-ken (JP); Shinya Ono, Kanagawa-ken (JP); Yoichi Taira, Tokyo-to (JP); Fumiaki Yamada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 13/030,271

(22) Filed: Feb. 18, 2011

(65) Prior Publication Data

US 2012/0045859 A1  Feb. 23, 2012

Related U.S. Application Data

(62) Division of application No. 11/621,559, filed on Jan. 9, 2007, now Pat. No. 7,936,412, which is a division of application No. 10/912,756, filed on Aug. 5, 2004, now Pat. No. 7,164,454.

(30) Foreign Application Priority Data

Aug. 19, 2003  (JP) ................................. 2003-295496

(51) Int. Cl.
*G02F 1/1335* (2006.01)
*F21V 8/00* (2006.01)
(52) U.S. Cl.
CPC ........ *G02B 6/0053* (2013.01); *G02F 1/133621* (2013.01); *G02F 1/133526* (2013.01)
USPC ............................................. 349/57; 349/95
(58) Field of Classification Search
USPC ..................................................... 349/95, 57
See application file for complete search history.

(56) References Cited

U.S. PATENT DOCUMENTS

| 4,686,519 | A | 8/1987 | Yoshida et al. |
| 5,398,125 | A | 3/1995 | Willett et al. |
| 5,566,007 | A | 10/1996 | Ikeda et al. |
| 5,801,795 | A | 9/1998 | Ogino |
| 6,064,452 | A | 5/2000 | Ogino |
| 6,151,166 | A | 11/2000 | Matsushita et al. |
| 6,359,719 | B1 | 3/2002 | Ori |
| 6,437,918 | B1 * | 8/2002 | Hamanaka et al. ........... 359/620 |
| 6,600,528 | B2 * | 7/2003 | Colgan et al. ................... 349/95 |
| 6,678,023 | B1 | 1/2004 | Yamazaki et al. |
| 7,164,454 | B2 | 1/2007 | Numata et al. |

FOREIGN PATENT DOCUMENTS

| JP | 9311329 A | 12/1997 |
| JP | 2000241812 A | 9/2000 |

\* cited by examiner

*Primary Examiner* — James Dudek
(74) *Attorney, Agent, or Firm* — Cantor Colburn LLP; Vazken Alexanian

(57) ABSTRACT

A method of forming liquid crystal cell for a color display device includes forming a liquid crystal layer and a prism structure between top and bottom substrates. Forming the prism structure includes forming a lens shaped die, coating a low refractive index resin on the lens shaped die, pasting the lens shaped die to the top substrate, and irradiating the coated low refractive index resin so as to set the low refractive index resin and form a low refractive index layer. The lens shaped die is removed from the low refractive index layer, a high refractive index resin is coated on the low refractive index layer by use of a planarizing die. The coated high refractive index resin is irradiated so as to set the high refractive index resin and form a high refractive index layer, and the planarizing die is removed from the high refractive index layer.

5 Claims, 14 Drawing Sheets

(a) DISTRIBUTION OF RGB EMITTED LIGHT FROM LIQUID CRYSTAL CELL (WITHOUT MICROPRISM BUILT IN CELL)

(b) DISTRIBUTION OF RGB EMITTED LIGHT FROM LIQUID CRYSTAL CELL (WITH MICROPRISM BUILT IN CELL)

(a)

DISTRIBUTION OF RGB EMITTED LIGHT FROM LIQUID CRYSTAL CELL
(WITHOUT DIFFRACTION GRATING FOR VIEWING ANGLE CORRECTION)

(b)

DISTRIBUTION OF RGB EMITTED LIGHT FROM LIQUID CRYSTAL CELL
(WITH DIFFRACTION GRATING FOR VIEWING ANGLE CORRECTION)

COLOR FILTERLESS DISPLAY DEVICE, OPTICAL ELEMENT, AND MANUFACTURE

CROSS-REFERENCE TO RELATED APPLICATIONS

This application is a divisional of U.S. patent application Ser. No. 11/621,559, filed Jan. 9, 2007, now U.S. Pat. No. 7,936,412, which is a divisional application of U.S. Pat. No. 7,164,454, which claims priority to Japanese Patent Application JP2003295496, with Japanese filing date of Aug. 19, 2003, and all the benefits accruing therefrom under 35 U.S.C. §119, the contents of which in its entirety are herein incorporated by reference.

FIELD OF THE INVENTION

The present invention relates to a color display device and the like, and more specifically, to a color display device capable of color display without using color filters, and the like.

BACKGROUND OF THE INVENTION

A color liquid crystal display device widely used in recent years among color display devices users has several hundred thousands to several million pixels. Each pixel is composed of R (red), G (green) and B (blue) sub-pixels. In order to display the R, G and B for each sub-pixel, R, G and B color filters are used in many cases, and a full color image is obtained by combining displays of the sub-pixels using these color filters. In the case of using such color filters, two-thirds of a light is absorbed by these color filters, and theoretically, approximately one-third of the light is only usable. In this connection, a color filterless display device performing color display without using the color filters is under study.

The following documents are considered herein:

[Patent Document 1] Gazette of Japanese Patent Laid-Open No. 2000-241812 (pp. 3 to 4, FIG. 1)

[Patent Document 2] Gazette of Japanese Patent Laid-Open No. Hei 9 (1997)-311329 (p. 6, FIG. 1)

[Patent Document 3] Specification of US Patent Application Publication No. 2002-0075427

FIG. 13 is a view showing an example of a color filterless liquid crystal display device, a configuration of a conventional color filterless and direct view liquid crystal display device using a spectral element (for example, refer to Patent Document 1). The device shown in FIG. 13 includes a light source 401 using, for example, a white fluorescent tube, an incidence optical system 402, a reflection sheet 403, a wedge-shaped light guide plate 404, a diffraction grating 405, and a cylindrical lens sheet 406 that is an optical element including a plurality of cylindrical lenses. Moreover, the device includes polarization films 407 sandwiching a liquid crystal cell 408 there-between, a liquid crystal layer 410 sandwiched between glass 409 and glass 409, all three of which compose the liquid crystal cell 408, and a diffusion/viewing angle correction film 411 made of a light diffusion film, a transmission diffraction grating film or the like.

In this color filterless and direct view liquid crystal display device, a white light incident from the light source 401 is guided by the wedge-shaped light guide plate 404, and a planer light is emitted in the vicinity of a desired incident angle. The white light incident from the wedge-shaped light guide plate 404 is separated by an optical element (spectral element) such as the diffraction grating 405 (and an optical hologram). By this light separation, three-color diffracted light of the R, G and B is emitted at angles where the blue (B) light and the red (R) light are arrayed to be substantially symmetric bilaterally with respect to the green (G) light diffracted to a frontal direction as a center. The diffracted light of the respective colors is made incident onto the cylindrical lens sheet 406. Here, one pixel among the display pixels is composed of three sub-pixels of the R, G and B. With regard to the light incident onto the cylindrical lens sheet 406, for the liquid crystal cell 408, the R light is made incident onto a sub-pixel for the R, the G light is made incident onto a sub-pixel for the G, and the B light is made incident onto a sub-pixel for the B. Then, transmission and cutoff of the light is controlled for each sub-pixel. On a surface of the liquid crystal cell 408, an emitted light from the liquid crystal cell has emission angles different depending on the wavelengths due to diffraction angles depending on wavelengths of the colors. Accordingly, in order to widen a viewing angle of the liquid crystal cell 408, the light diffusion/viewing angle correction by the diffusion/viewing angle correction film 411 is performed. Note that, also in other color display devices such as a color filterless liquid crystal projection device, lights of the respective colors, which is made incident onto a liquid crystal cell in a state of being emitted from a white light source, separated by a dichroic mirror, a diffraction grating or the like, and condensed by a lens element, has different incident angle for each of the respective colors of the R, G and B.

However, in the conventional color filterless and direct view liquid crystal display device as shown in FIG. 13, a problem remains in terms of an effect of such a viewing angle correcting function member. By use only of the usual diffusion/viewing angle correction film 411, the emission angles from the liquid crystal cell, which depend on the wavelengths, are maintained even after the emitted light transmits through the diffusion/viewing angle correction film 411. In order to equalize color reproductivity and color balance and to widely secure the viewing angle, it is desired to add a far more improvement. Accordingly, it is also conceivable to separately use a transmission diffraction grating film as the viewing angle correcting function member. However, film design to control diffraction efficiencies different depending on the wavelengths and to correct intensity of the incident light of every wavelength with high accuracy into a distribution of the equalized viewing angles is accompanied with difficulty. Moreover, a significant lowering of a peak value of luminance to the frontal direction cannot be avoided. For example, a relative value of luminance of the emitted light on the front in comparison to the incident light onto the correction film is undesirably lowered to 30 to 40%. Furthermore, because of a combination of the materials having the different refractive indices, fabrication itself of a film into a shape combining high diffraction efficiency and a smooth surface is difficult. For example, in a diffraction grating having a triangular cross-sectional shape and using materials with refractive indices of 1.42 and 1.57, arithmetically, such a shape incapable of being fabricated, as in which an inner inclination angle between the two layers is 70 to 80 degrees, is needed.

FIGS. 14(a) and 14(b) are graphs showing distributions of the emitted light in the color filterless and direct view liquid crystal display device. FIG. 14(a) shows a distribution of the emitted light in the case where the viewing angle correcting diffraction grating is not provided, and FIG. 14(b) shows a distribution of the emitted light in the case where the transmission diffraction grating film is concurrently used as the viewing angle correcting function member. In each of the graphs, an abscissa axis represents an output angle, an ordinate axis represents transmissivity, and the distributions of the emitted light of the respective colors R, G and B are shown. In comparison with the case where the viewing angle correcting diffraction grating is not provided, which is shown in FIG. 14(a), in the case where the viewing angle correcting diffraction grating is provided, which is shown in FIG. 14(b), each center of the emitted light R, G and B comes close to a frontal direction of a panel. However, deviations among the lights of the respective colors are not removed, and the viewing angle correcting function member does not necessarily have a sufficient viewing angle correcting function.

The following should be noted. It has been measured that the color reproductivity (an area of a region displayable by the color display device in a chromaticity diagram) in the frontal direction in the case of concurrently using the transmission diffraction grating film as the viewing angle correcting function member becomes, for example, approximately 38% at the NTSC rate, which remains equal to or less than 42% at the NTSC rate of a direct view liquid crystal display device added with an existing 13.3-inch color filter. Moreover, if a condition of a viewing angle at which chromaticity is regarded as uniform is defined such that an error between a subject emitted component and an emitted component to the frontal direction falls within a range equal to or less than 0.02 in both chromaticity coordinates x and y, it has been confirmed that an emission angle range meeting the condition remains within, for example, a narrow range from −5 to +7 degrees. Because of these defects, with the transmission diffraction film, it is difficult to accomplish a sufficient viewing angle correcting function in luminance/chromaticity. Accordingly, a new viewing angle correcting method for improving viewing angle performance is required. Moreover, with regard to the luminance, from an observation of the inventors of the present invention, it is grasped that, for example, a luminance value on the front side before adding the transmission diffraction grating film is approximately 217 cd/m.sup.2, and a luminance value on the front side thereafter is approximately 85 cd/m.sup.2, both of which are results of attenuation to 40% or less in such an insufficient state of the color reproductivity. Therefore, an improvement for enhancing the luminance is also necessary.

Here, as the conventional viewing angle correcting function member, a structure has been proposed, in which lens-shaped or prism-shaped concave portions are processed and formed in a size corresponding to opening portions of the respective sub-pixels of the R, G and B on a black matrix-side surface of an emission-side glass substrate of the liquid crystal cell, and polymer having a refractive index higher than that of the glass substrate is injected into the concave portions, thus planarizing the surface (for example, refer to Patent Document 2). Moreover, the inventors of the present invention have proposed a technology in which a simple prism structure or a Fresnel-type microprism structure is introduced to the color filterless and direct view liquid crystal display device (refer to Patent Document 3).

In the above-described technology described in Patent Document 2, a viewing angle correction effect to the frontal direction by refraction can be expected to some extent. However, a cycle of a lens/prism structure is designed while corresponding to an amount of one pixel, that is, of three sub-pixels, and accordingly, in terms of paralleling the emitted light by restricting an angle expansion phenomenon itself thereof, which is caused by the condensing function element between a backlight and the liquid crystal cell, a diffusion suppression effect cannot be expected. Particularly, though an R light and a B light, which are made incident onto ends of a lens portion (denoted by a reference numeral 30 in FIG. 1), are illustrated as if both of the light became parallel to each other when being emitted in the content illustrated in FIG. 1 of Patent Document 2, the incident light is actually emitted to a diffusing direction on such illustrated ends of the lens portion. Therefore, a sufficient angle correction cannot be performed.

Moreover, in the technology proposed in Patent Document 3, far more problems to be solved for practical use are left. For example, a light travels from a low refractive layer to a high refractive layer in the technology proposed in Patent Document 3, and in order to perform the angle correction, it is necessary to improve a prism structure described in Patent Document 3. Particularly, it is necessary to study more in order to make it difficult to produce "shading" for the incident light.

SUMMARY OF THE INVENTION

Therefore, the present invention provides solutions to the technical problems described above. It is an aspect of the present invention to realize a display image, which has, for example, wide-range color reproductivity and a wide viewing angle and is clear without blur, by performing an angle correction for each sub-pixel to a desired direction in response to an incident angle of an incident light.

It is another aspect of the present invention to make substantially parallel emitted light of each sub-pixel to the other by the angle correction.

It is still another aspect of the present invention to improve the color reproductivity by performing a design corresponding to a spectral structure of wavelengths included in a light source.

On the basis of such aspects, in a color display device to which the present invention is applied, first, a light irradiated from, for example, a white light source is separated into lights of a plurality of wavelength regions by wavelength separation means such as, for example, a diffraction grating. Then, by condensing means for receiving the light separated by this wavelength separating means and formed of, for example, a lens and the like, the lights of predetermined wavelength regions is condensed while corresponding to predetermined sub-pixels (for example, sub-pixels of red (R), green (G) and blue (B) constituting one pixel). With regard to the condensed light, due to diffraction angles depending on the wavelengths, angle distributions of the emitted light from the respective sub-pixels do not coincide with one another, for example, in the respective colors of the red (R), green (G) and blue (B). Accordingly, a configuration is adopted such that the light of the respective sub-pixels, which is condensed by the condensing means for the respective sub-pixels, is emitted by the angle correcting means while giving thereto a distribution of emission angles approximately symmetric and equivalent with respect to a frontal direction as a center.

A color display device to which the present invention is applied comprises: a light source; wavelength separation means for separating a light irradiated from the light source into lights of a plurality of wavelength regions; condensing means for receiving the light separated by this wavelength separation means and condensing lights of predetermined wavelength regions while corresponding to predetermined sub-pixels; and angle correcting means for substantially paralleling the light of each sub-pixel toward a predetermined direction, the light being condensed by the condensing means for each of the sub-pixels.

A color display device to which the present invention is applied is characterized in that, in the structure portion for correcting an angle of the light of each sub-pixel, the light being condensed by the condensing element, for each of the sub-pixels corresponding to the red (R), the green (G) and the blue (B), a high refractive index layer is formed on a side onto which the light is made incident from the condensing element, a low refractive index layer is formed on an emitting side from which the light is emitted, and a predetermined interface is formed by these layers, and the interface is characterized by being substantially symmetric bilaterally and tilted to approximately 45 degrees for the sub-pixels corresponding to the red (R) and the blue (B), and tilted to approximately 14 degrees for the sub-pixel corresponding to the green (G).

The present invention also provides an optical element for correcting emission angles of a light incident at different angles depending on wavelengths, comprising: a high refractive index layer formed of first polymer and provided on a light incident side; and a low refractive index layer formed of second polymer having a refractive index lower than the first polymer and provided in contact with the high refractive index layer on a light emitting side, characterized in that the high refractive index layer and the low refractive index layer have different shapes for each of sub-pixels corresponding to respective colors of red (R), green (G) and blue (B). Here, these high refractive index layer and low refractive index layer can be characterized by forming a prism structure, and characterized in that angles of prisms differ for each of the sub-pixels. Moreover, these high refractive index layer and low refractive index layer can be characterized by forming a lens structure for each of the sub-pixels.

Furthermore, the present invention provides a method of manufacturing a color display device made by forming an optical element on a substrate. A manufacturing method comprises the steps of: coating low refractive index photo-setting resin on a die on which a predetermined shape is formed in response to sub-pixels corresponding to respective colors; pasting these die and substrate together and irradiating a light on the coated low refractive index photo-setting resin for setting; after peeling off the die, coating high refractive index photo-setting resin on the set low refractive index resin by use of a planarizing die; an irradiating light on the coated high refractive index photo-setting resin for setting; and peeling off the planarizing die from the substrate.

According to the present invention, for example, in the color display device which does not use the color filter but utilizes the spectral element, color display having wide color reproductivity, a wide viewing angle and clearness and restricting blur can be realized.

BRIEF DESCRIPTION OF THE DRAWINGS

For a more complete understanding of the present invention and the advantages there of, reference is now made to the following description taken in conjunction with the accompanying drawings, in which.

DETAILED DESCRIPTION OF THE INVENTION

Figure 1:
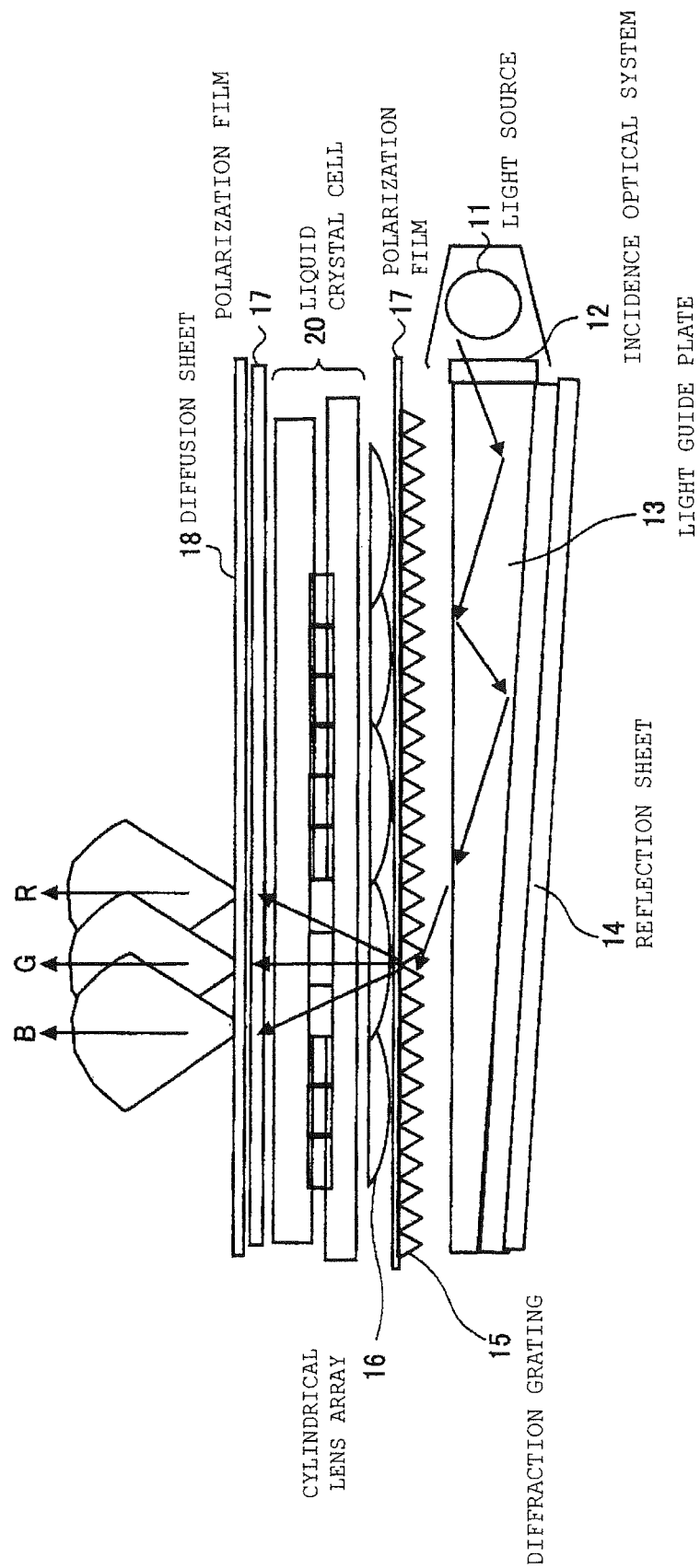
FIG. 1 is a view showing a configuration of a color filterless liquid crystal display device (color filterless and direct view liquid crystal display device) to which this embodiment is applied.

The present invention provides a display image, which has, for example, wide-range color reproductivity and a wide viewing angle and is clear without blur, by performing an angle correction for each sub-pixel to a desired direction in response to an incident angle of an incident light. The present invention also makes substantially parallel emitted light of each sub-pixel to the other by the angle correction. The present invention also improves the color reproductivity by performing a design corresponding to a spectral structure of wavelengths included in a light source.

In a color display device to which the present invention is applied, first, a light irradiated from, for example, a white light source is separated into lights of a plurality of wavelength regions by wavelength separation means such as, for example, a diffraction grating. Then, by condensing means for receiving the light separated by this wavelength separating means and formed of, for example, a lens and the like, the lights of predetermined wavelength regions is condensed while corresponding to predetermined sub-pixels (for example, sub-pixels of red (R), green (G) and blue (B) constituting one pixel). With regard to the condensed light, due to diffraction angles depending on the wavelengths, angle distributions of the emitted light from the respective sub-pixels do not coincide with one another, for example, in the respective colors of the red (R), green (G) and blue (B). Accordingly, a configuration is adopted such that the light of the respective sub-pixels, which is condensed by the condensing means for the respective sub-pixels, is emitted by the angle correcting means while giving thereto a distribution of emission angles approximately symmetric and equivalent with respect to a frontal direction as a center.

Here, this angle correcting means can be characterized by being constituted of an optical structure in which a light incident side is made of a high refractive index layer, a light emitting side is made of a low refractive index layer, and a shape is made to differ for each of the sub-pixels. More specifically, this angle correcting means is characterized by having a prism structure or a Fresnel-type microprism structure in which an angle of an interface between the high refractive index layer and the low refractive index layer is different for each of the sub-pixels. Furthermore, if a configuration is adopted so as to include cutoff means for cutting off a light of a wavelength other than the light separated into each of the sub-pixels, in which its shape is determined to meet that wavelength, it is preferable in that, for example, an orange wavelength component and a cyan wavelength component, which hinder the color reproductivity, can be sufficiently cut out.

An example of a color display device to which the present invention is applied comprises: a light source; wavelength separation means for separating a light irradiated from the light source into lights of a plurality of wavelength regions; condensing means for receiving the light separated by this wavelength separation means and condensing lights of predetermined wavelength regions while corresponding to predetermined sub-pixels; and angle correcting means for substantially paralleling the light of each sub-pixel toward a predetermined direction, the light being condensed by the condensing means for each of the sub-pixels. More specifically, this angle correcting means can be characterized by forming, by a high refractive index layer and a low refractive index layer, a microlens structure in which a light incident side is made of the high refractive index layer, a light emitting side is made of the low refractive index layer, and tilt angles are different for each of the sub-pixels.

Moreover, when being grasped from another viewpoint, the present invention is a color display device for expressing one pixel by three sub-pixels of red (R), green (G) and blue (B), comprising: a light source; a spectral element for separating a light irradiated from this light source into lights of a plurality of wavelength regions; a condensing element for receiving the light separated by this spectral element and condensing the light while corresponding to each of the sub-pixels of the red (R), green (G) and blue (B); and a structure portion for correcting an angle of the light condensed by the condensing element for each of the sub-pixels corresponding to the red (R), the green (G) and the blue (B), characterized in that this structure portion forms, by a high refractive index layer and a low refractive index layer, a Fresnel-type microprism structure in which a side onto which the light is made incident from the condensing element is made of the high refractive index layer, an emitting side from which the light is emitted is made of the low refractive index layer.

Here, the Fresnel-type microprism structure in this structure portion can be characterized by having shapes different for each of the sub-pixels. More specifically, if this Fresnel-type microprism structure in the structure portion is characterized by forming slopes having basic angles at approximately 45 degrees for the sub-pixels of the red (R) and blue (B) and a basic angle at approximately 14 degrees for the sub-pixel of the green (G), it is preferable in that the viewing angle characteristics and the color reproductivity in the frontal direction can cover a wide range. Moreover, if, the Fresnel-type microprism structure in this structure portion is characterized in that a basic angle of an opposite slope of the microprism structure is 70 degrees or more to less than 90 degrees, this is excellent also in that "shading" caused by a light colliding with this opposite slope adjacent to the slope can be restricted more.

An example of a color display device to which the present invention is applied is characterized in that, in the structure portion for correcting an angle of the light of each sub-pixel, the light being condensed by the condensing element, for each of the sub-pixels corresponding to the red (R), the green (G) and the blue (B), a high refractive index layer is formed on a side onto which the light is made incident from the condensing element, a low refractive index layer is formed on an emitting side from which the light is emitted, and a predetermined interface is formed by these layers, and the interface is characterized by being substantially symmetric bilaterally and tilted to approximately 45 degrees for the sub-pixels corresponding to the red (R) and the blue (B), and tilted to approximately 14 degrees for the sub-pixel corresponding to the green (G).

Furthermore, when being grasped from another viewpoint, in a structure portion for correcting an angle of the light of each sub-pixel, the light being condensed by the condensing element, for each of the sub-pixels corresponding to the red (R), the green (G) and the blue (B), a color display device to which the present invention is applied makes a high refractive index layer on a side onto which the light is made incident from the condensing element, makes a low refractive index layer on an emitting side from which the light is emitted, and forms a predetermined interface by these layers, and the interface forms a lens structure for each of the sub-pixels. Here, if this lens structure is characterized in that a tilt angle is set for each of the sub-pixels, it is preferable in that a substantially parallel light mainly directed to the frontal direction can be obtained in each sub-pixel. Moreover, if the interface of this structure portion is characterized by including a Fresnel-type microlens structure formed of shapes different for each of the sub-pixels, it is made possible to thin thickness of the structure portion.

Moreover, the present invention provides an optical element for correcting emission angles of a light incident at different angles depending on wavelengths, comprising: a high refractive index layer formed of first polymer and provided on a light incident side; and a low refractive index layer formed of second polymer having a refractive index lower than the first polymer and provided in contact with the high refractive index layer on a light emitting side, characterized in that the high refractive index layer and the low refractive index layer have different shapes for each of sub-pixels corresponding to respective colors of red (R), green (G) and blue (B). Here, these high refractive index layer and low refractive index layer can be characterized by forming a prism structure, and characterized in that angles of prisms differ for each of the sub-pixels. Moreover, these high refractive index layer and low refractive index layer can be characterized by forming a lens structure for each of the sub-pixels.

Furthermore, the present invention can be grasped as a method of manufacturing a color display device made by forming an optical element on a substrate. This manufacturing method comprises the steps of: coating low refractive index photo-setting resin on a die on which a predetermined shape is formed in response to sub-pixels corresponding to respective colors; pasting these die and substrate together and irradiating a light on the coated low refractive index photo-setting resin for setting; after peeling off the die, coating high refractive index photo-setting resin on the set low refractive index resin by use of a planarizing die; an irradiating light on the coated high refractive index photo-setting resin for setting; and peeling off the planarizing die from the substrate.

Thus, in accordance with the present invention, a color display device which does not use a color filter but utilizes a spectral element, color display having wide color reproductivity, a wide viewing angle and clearness and restricting blur can be realized.

Embodiments of the present invention will be described below in detail with reference to the accompanying drawings.
Embodiment 1

FIG. 1 is a view showing a configuration of a color filterless liquid crystal display device (color filterless and direct view liquid crystal display device) to which this embodiment is applied. This color filterless liquid crystal display device includes a light source 11 using, for example, a straight white fluorescent tube, an incidence optical system 12 a guiding light from the light source 11, a light guide plate 13 having, for example, a wedge shape, a reflection sheet 14, and a diffraction grating 15 as a spectral element separating the incident white light into a red (R) light, a green (G) light and a blue (B) light. Moreover, this liquid crystal display includes a liquid crystal cell 20, a cylindrical lens array 16 as an optical element (condensing element) provided with a plurality of cylindrical lenses or the like, polarization films 17, and a diffusion film 18. The liquid crystal cell 20 includes a liquid crystal layer inserted between two glass substrates as will be described later. Moreover, between the two glass substrates, the liquid crystal cell 20 includes a prism structure portion (to be described later) as a characteristic configuration in this embodiment. Note that, in this embodiment, a film for correcting a viewing angle, which has been conventionally provided in a portion of the diffusion film 18, is not needed.

The light irradiated from the light source 11 is made incident onto the light guide plate 13 through the incidence optical system 12. The light incident onto the light guide plate 13 makes an angle thereof gradually steep while repeatedly reflecting on a lower surface (reflection sheet 14-side surface) and upper surface (liquid crystal cell 20-side surface) of the light guide plate 13. When a direction of the light exceeds a critical angle on the upper surface, the light is emitted from this upper surface. The emitted light is separated into the R, G and B light in the diffraction grating 15 or an optical element (spectral element) such as, for example, an optical hologram, which functions as one of wavelength separation means. The separated light is polarized by the polarization film 17 and made incident onto the cylindrical lens array 16. In the cylindrical lens array 16, the plurality of cylindrical lenses are provided, and for example, one cylindrical lens corresponds to one pixel. One pixel is composed of three sub-pixels that are for the R, G and B. For the separated and polarized light, transmission or cutoff is controlled for each sub-pixel by the liquid crystal cell 20. The light for each sub-pixel, which has transmitted through the liquid crystal cell 20, passes through the polarization film 17 and is diffused by the diffusion film 18.

Figure 14:
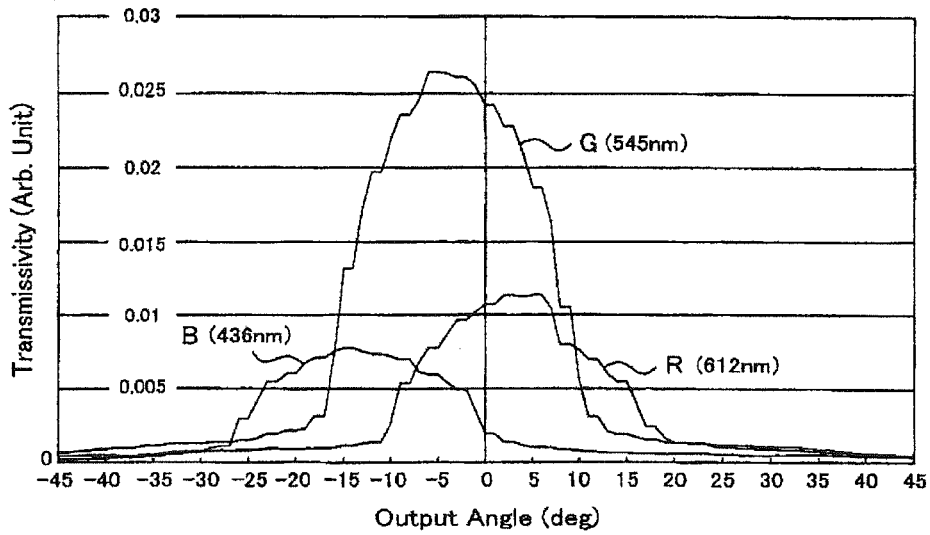
FIGS. 14(a) and 14(b) are graphs showing distributions of an emitted light in the color filterless and direct view liquid crystal display device.
Figure 14:
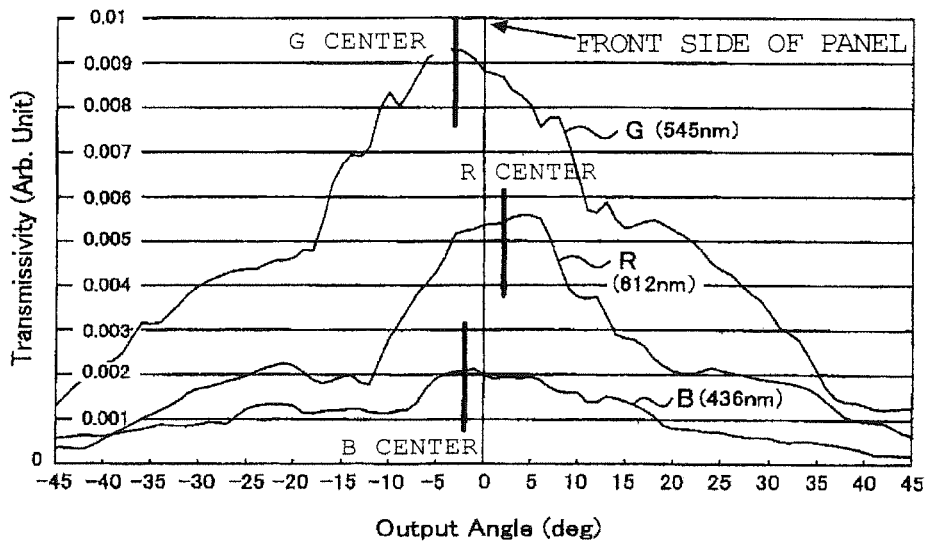

In such a color filterless liquid crystal display device as shown in FIG. 1, accompanied with position conversion in response to angles by the cylindrical lens array 16 that is a lens element, the emitted light from a backlight system, which has emission angles different depending on the wavelengths, is made incident onto specific sub-pixels among the respective pixels in the liquid crystal cell 20 in a condensed state. In this case, in order to sufficiently enhance viewing angle characteristics in a distribution of the emitted light of the liquid crystal cell 20 in the direct view and color filterless liquid crystal display device, it is necessary to solve asymmetry in luminance/chromaticity in the distribution of the emitted light and a shortage of the viewing angle correcting function itself, both of which have been regarded as problems in the conventional viewing angle correction film as shown in FIG. 14(b). In order to impart, to such incident components onto the liquid crystal cell 20, a distribution of emission angles from the liquid crystal cell, which are symmetric and equivalent with respect to the frontal direction as a center, in this embodiment, an optical element having a microprism structure as below is introduced such that desired angle corrections can be performed for the whole of the incident light. The microprism structure is: a simple microprism structure (in FIG. 2 and the like to be referred to later) built in the liquid crystal cell; or a linear Fresnel-type microprism structure (in FIG. 3 and the like to be referred to later), each of which changes a shape thereof for each sub-pixel corresponding to each color of the R, G and B. Thus, design for optimization is performed.

Here, a method is also conceivable, in which a viewing angle correcting function member of a similar shape to that of the above-described optical element is realized by an independent prism array sheet and pasted on the concerned liquid crystal cell 20. However, in such a case, due to optical design in which an image is formed in the liquid crystal cell 20, a parallax occurs in the emitted light after the viewing angle correction. Moreover, in the case of pasting such an optical film on the glass substrate 22, it is proven that alignment accuracy thereof with the liquid crystal cell 20 greatly deviates from a tolerance due to a mechanical stress, and for example, remains as low as ±70 μm or more per 200 mm. Accordingly, in this embodiment, the microprism structure of the liquid crystal cell built-in type is adopted.

Note that the configuration of the liquid crystal cell 20 in the color filterless liquid crystal display device as shown in FIG. 1 can also be applied to a liquid crystal projection display device projecting a projection image on a screen.

Figure 2:
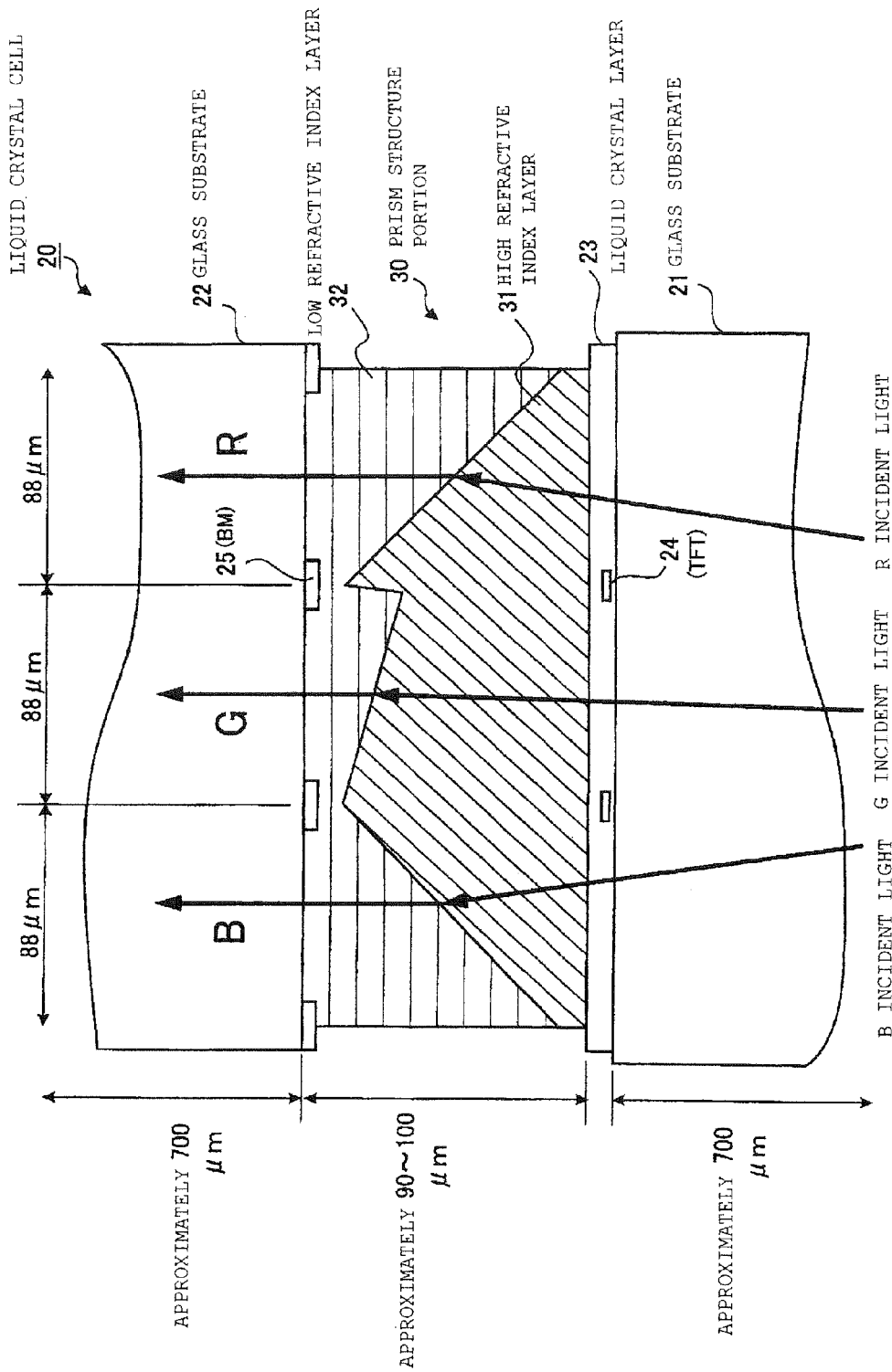
FIG. 2 is a view for explaining a simple microprism structure built in a liquid crystal cell of this embodiment.

FIG. 2 is a view for explaining the simple microprism structure built in the liquid crystal cell 20 of this embodiment. The liquid crystal cell 20 shown in FIG. 2 includes a liquid crystal layer 23 and a prism structure portion 30 between a bottom-side glass substrate 21 and a top-side glass substrate 22. In the liquid crystal layer 23, TFTs 24 are formed, and on the top-side glass substrate 22, a black matrix (BM) 25 partitioning the respective sub-pixels of the R, G and B is provided. In the prism structure portion 30, a high refractive index layer 31 having a refractive index of, for example, 1.55 is provided on a light incident side (bottom side), and a low refractive index layer 32 having a refractive index of, for example, 1.408 is provided on a light emitting side (top side). For this high refractive index layer 31, for example, photosetting acrylic resin is used as first polymer, and for the low refractive index layer 32, for example, fluoridated photosetting acrylic resin can be used as second polymer.

In designing such a simple microprism structure, the inventors of the present invention determined a shape of the prism structure portion 30, which adjusts, in the prism structure portion built in the cell, viewing angle dependencies mutually different and inherent in the light of the respective colors of R, G and B when being made incident onto the liquid crystal cell 20, and maximizes the viewing angle characteristics and the color reproductivity in the frontal direction. Mainly, the inventors determined the optimum inclination angle and basic angle of the prism. In designing the prism structure portion 30, an actual value of a viewing angle distribution of each wavelength component emitted from the spectral element (diffraction grating 15) with regard to an emission intensity from the backlight is utilized. Then, by a calculation method of performing ray tracing for a light intensity from the cylindrical lens array 16 to the liquid crystal cell 20 building the prism structure portion 30 therein by use of three values of relative position coordinates thereof to a wavelength, an angle and a pixel as parameters, high accuracy design calculation coinciding quantitatively with the actual value was performed. By this design calculation, there was obtained a result to the effect that the viewing angle characteristics and the color reproductivity in the frontal direction cover the widest range when an inclination angle of an interface between the high refractive index layer 31 and the low refractive index layer 32 for each sub-pixel of the red (R) and blue (B) is approximately 45 degrees and an inclination angle of an interface between the high refractive index layer 31 and the low refractive index layer 32 for the sub-pixel of the green (G) is approximately 14 degrees. In the liquid crystal cell 20 shown in FIG. 2, in order to set, at 45 degrees, the inclination angle of the interface between the high refractive index layer 31 and the low refractive index layer 32, through which the incident light of the R and B transmits while being refracted, as a thickness of the prism structure portion 30, approximately 90 to 100 µm is necessary for 88 µm of a width of one sub-pixel. Note that a thickness of each of the glass substrates 21 and 22 is approximately 700 µm.

Figure 3:
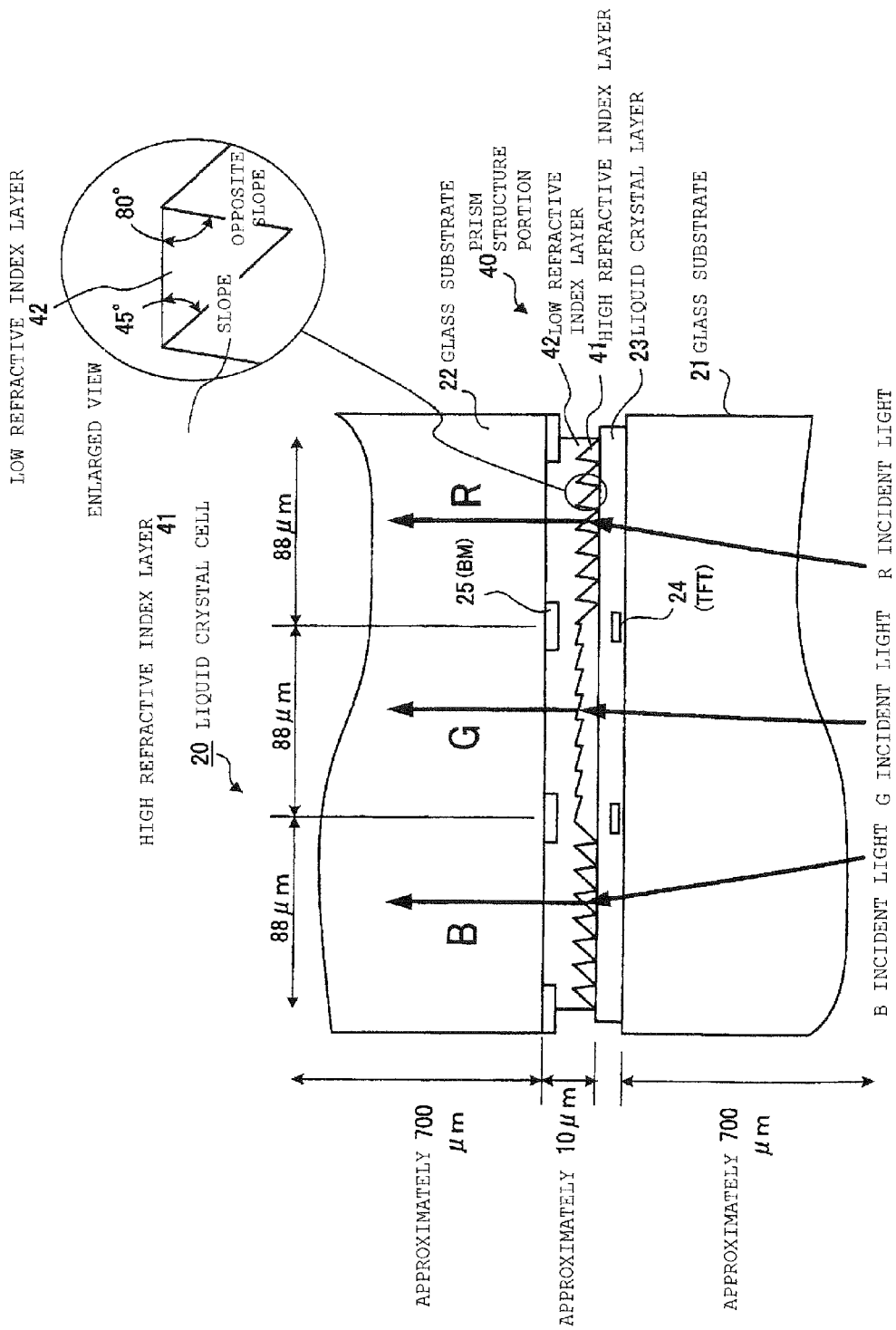
FIG. 3 is a view for explaining a linear Fresnel-type microprism structure built in the liquid crystal cell of this embodiment, as a structure replacing that in FIG. 2.

FIG. 3 is a view for explaining the linear Fresnel-type microprism structure built in the liquid crystal cell 20 of this embodiment, as a structure replacing that in FIG. 2. A prism structure portion 40 shown in FIG. 3 is different from the structure shown in FIG. 2 in that a microprism structure formed of a high refractive index layer 41 and a low refractive index layer 42 is formed of a fine Fresnel prism having shapes of small convexes and concaves on surfaces thereof. By adopting this fine Fresnel type, a thickness of the prism structure portion 40 shown in FIG. 3 can be thinned to approximately 10 µm. Moreover, the prism structure portion 40 can be made as a thin flat layer, and it is also made possible to reduce unevenness of a cell gap and to maintain evenness thereof. In the example shown in FIG. 3, two kinds of polymers, which have a cycle of the Fresnel prism in the prism structure portion 40 at 88 µm, and individually have refractive indices of 1.55 (for the high refractive index layer 41) and 1.408 (for the low refractive index layer 42), are combined, and a Fresnel prism having a cyclic structure of a triangular cross-sectional shape is formed. As shown in an enlarged view shown in FIG. 3, with regard to the shape of each triangle in this Fresnel prism, a basic angle of a slope is 45 degrees and a basic angle of a slope opposite thereto is 80 degrees in the sub-pixel portion of the R. The sub-pixel portion of the B also has a triangular shape symmetric bilaterally to that of the R, and is formed at the same basic angles. Meanwhile, the sub-pixel portion of the G is formed such that a basic angle of a slope is 14 degrees and a basic angle of a slope opposite thereto is 80 degrees. With such formation, the viewing angle characteristics can be enhanced, and the color reproductivity in the frontal direction can cover a wide range.

Here, in this embodiment, the incident light of each color travels from the high refractive index layers 31 and 41 to the low refractive index layers 32 to 42. On the other hand, in Patent Document 3 described in the background art, this relation is inverted, and the incident light travels from a low refractive index layer to a high refractive index layer. The slopes of the Fresnel prism shown in the enlarged view of FIG. 3 have an object to perform angle correction of the incident light by refraction and transmission thereof. However, when the incident light travels from the low refractive index layer to the high refractive index layer as in the background art, the incident light is expanded, and the angle correction thereof comes to be impossible. Moreover, even if an orientation of the slope of the Fresnel prism is adjusted, the other of the pair of slopes, which is the opposite slope, will be located to a center side of each pixel and receive the incident light more. This will make shading prone to occur in the incident light, and will result in that components reflecting and diffusing in directions other than the direction for the angle correction are increased. As such a result that the shading occurs in the incident light on the opposite slope, a small peak becoming a hindrance of the angle correction appears in an emission distribution and deteriorates the color reproductivity. Therefore, as in this embodiment, it is effective to adopt the structure in which the incident light travels from the high refractive index layers 31 and 41 to the low refractive index layers 32 and 42.

Figure 4:
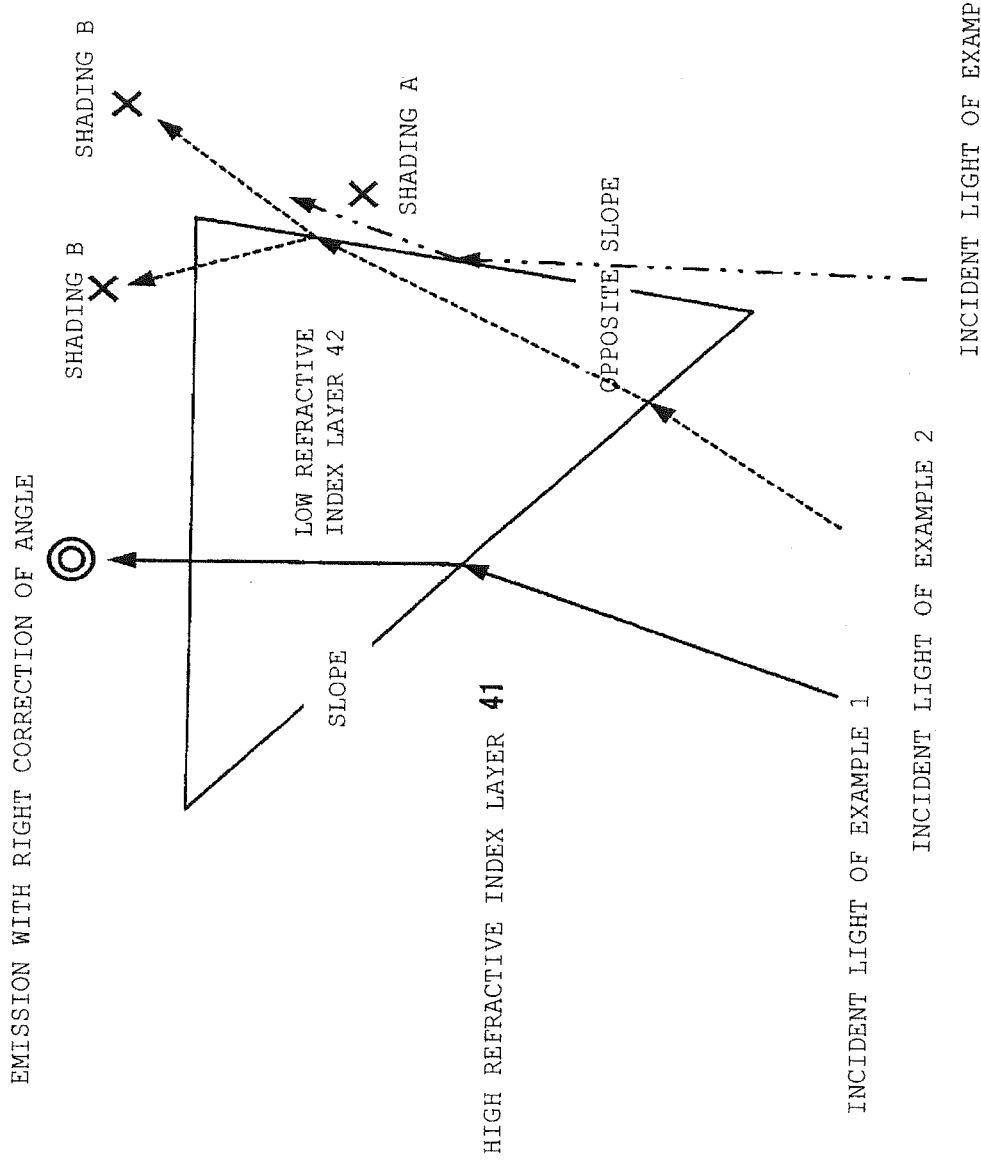
FIG. 4 is a view for explaining optimization of a relationship between an incident light (emitted light) and two basic angles of a slope and an opposite slope.

Next, two basic angles of the slope and the opposite slope will be described. FIG. 4 is a view for explaining optimization of a relationship between the incident light (emitted light) and the two basic angles of the slope and the opposite slope. Among the incident light onto the Fresnel-type microprism structure, incident light of Example 1, which is shown in FIG. 4, is refracted on the slope formed of the high refractive index layer 41 and the low refractive index layer 42, and becomes an incident light for which a right correction of the angle has been performed. However, a part of the incident light does not collide with the slope formed originally for correcting the angle, but first collides with the opposite slope to cause the shading, and is reflected/diffused to the direction other than the direction for the angle correction. A ratio of this reflected/diffused light is increased as the basic angle of the opposite slope becomes smaller and an inclination thereof becomes gentler. In FIG. 4, a state is shown, where an incident light of Example 3 is reflected/diffused on the opposite slope and becomes shading A. Meanwhile, when the basic angle of the opposite slope in each prism in the Fresnel-type microprism structure is set at, for example, 90 degrees or more, a part of a light component that has been refracted on and transmitted through the slope for use in the angle correction then collides with the opposite slope adjacent thereto, the shading becomes prone to occur, and the reflection/diffusion to the direction other than the direction for the angle correction become prone to occur. In FIG. 4, a state is shown, where an incident light of Example 2, which is a part of the light component that has been refracted on and transmitted through the slope, is reflected/diffused by the opposite slope and causes shadings B. An occurrence rate of these shadings B is increased as the basic angle of the opposite slope as shown in the enlarged view of FIG. 3 becomes larger and steeper. Moreover, also from a viewpoint of manufacturing the structure, difficulty fabricating a metal die and a copy of the structure is increased as the basic angle of the opposite slope becomes steeper.

Figure 5:
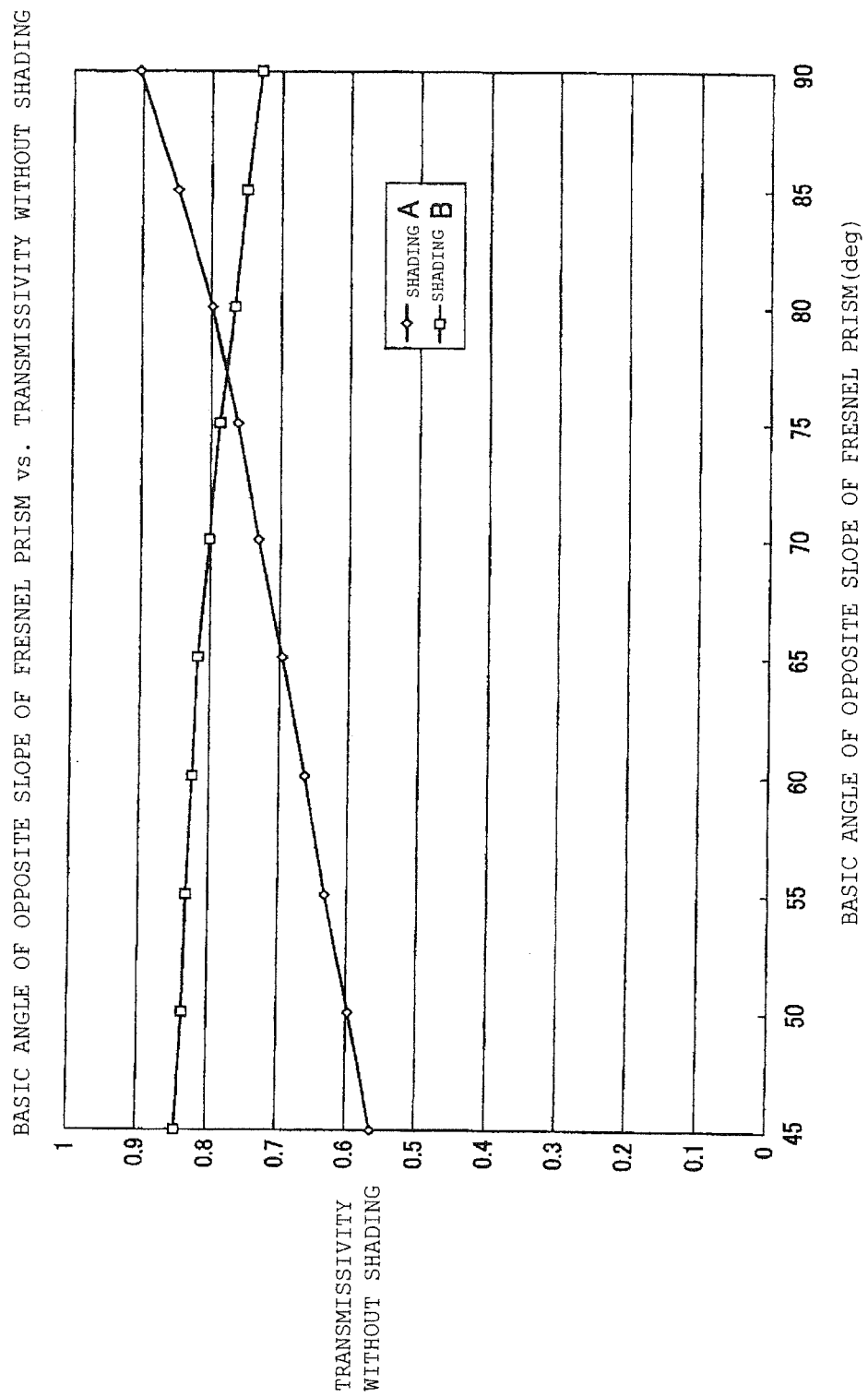
FIG. 5 is a graph showing a relationship between the basic angle of the opposite slope and occurrence rates of two kinds of shadings, which are shading A and shading B.

FIG. 5 is a graph showing a relationship between the basic angle of the opposite slope and the occurrence rates of the two kinds of shadings, which are the shading A and the shading B. An abscissa axis represents the basic angle (deg) of the opposite slope of the Fresnel prism, and an ordinate axis represents a ratio of an emitted light without shading. The shading A is reduced as the basic angle (inclination angle) of the opposite slope becomes larger. Meanwhile, the shading B is reduced as the basic angle of the opposite slope becomes smaller. Under conditions in this embodiment, an intersection of the occurrence rates at which these two kinds of shadings occur is within a range from 70 degrees or more to less than 90 degrees of the basic angle of the opposite slope, and preferably, within a range from 75 degrees to 80 degrees. In the prism structure portion 40 in this embodiment, for the purpose of restricting the occurrence rate of the shading A that reflects/diffuses the emitted light at a larger angle and asymmetrizes the distribution thereof, design is made such that the basic angle of the opposite slope is set somewhat large and the optimum value thereof becomes 80 degrees (less than 90 degrees).

In such a way, in this embodiment, the two-layer flat structure of the linear Fresnel-type microprism shape, which is extremely thinned, can be formed easily in the liquid crystal cell 20 as shown in FIG. 3. Accordingly, the structure does not hinder the evenness of the cell gap, and it is possible to incorporate the structure in an additional process in a manufacturing process of the conventional liquid crystal cell 20. Moreover, it is possible to make the individual prism shape in the sub-pixel into a variable structure, and accordingly, a local fine adjustment to meet the optimum optical design condition is also made possible.

Here, a white-color display was performed by the color filterless and direct view liquid crystal display device employing the microprism built in the liquid crystal cell, and the emitted lights from the respective sub-pixels was observed by microscope. Then, it was able to be confirmed that color emissions in response to the respective sub-pixels of the red, green and blue were realized in the frontal direction with high positioning accuracy. With regard to frontal luminance in a prototype, an actual value is 200 cd/m.sup.2 (162 cd/m.sup.2 without the microprism) while a design value is 204 cd/m.sup.2. This is a luminance value more than twice luminance when using a viewing angle correcting diffraction grating film using a similar backlight. By the microprism, the angle correction is performed for the light of every wavelength, which is included in the white light source, to the vicinity of the frontal direction, and accordingly, an enhancement of the frontal luminance is confirmed as compared with the case without using the prism.

Figure 6:
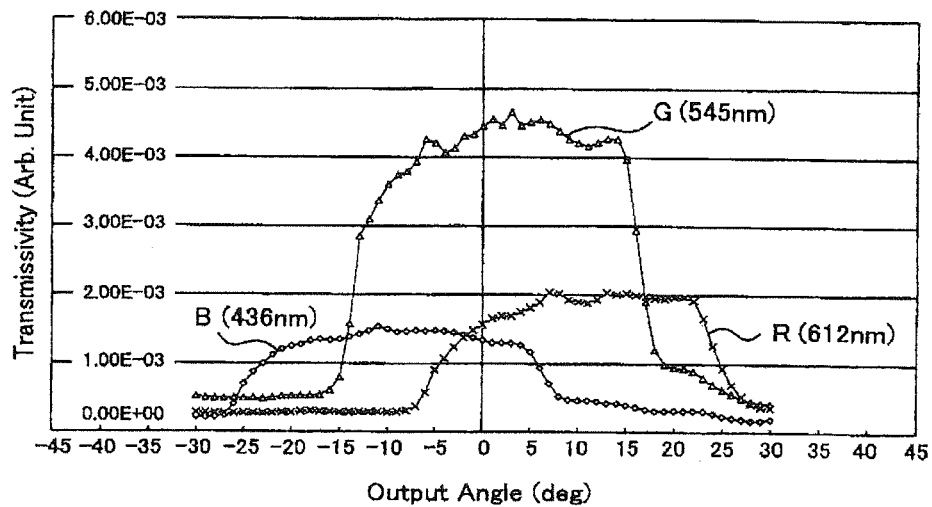
FIGS. 6(a) and 6(b) are graphs showing results obtained by actually measuring differences in a distribution of viewing angles of spectrum intensities of lights of respective colors of R, G and B (when displaying a white color) before and after forming a microprism in the liquid crystal cell.
Figure 6:
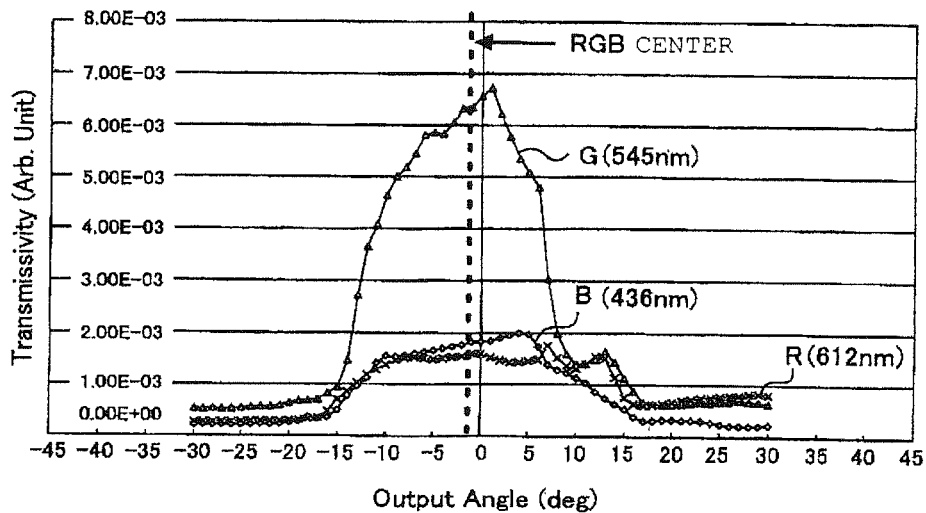

FIGS. 6(a) and 6(b) are graphs showing results obtained by actually measuring differences in the distribution of the viewing angles of spectrum intensities of the light of the respective colors of R, G and B (when displaying the white color) before and after forming the microprism in the liquid crystal cell. FIG. 6(a) shows actual values before forming the microprism, and FIG. 6(b) shows actual values after forming the microprism. Abscissa axes represent output angles, and ordinate axes represent transmissivities. Both of the graphs show the distributions of the respective emitted lights of the R, G and B. In the result after adding the microprism, which is shown in FIG. 6(b), it can be confirmed that centers of the light intensities of the respective colors are corrected to the vicinity of the frontal direction and are overlapped with one another. The color reproductivity in the frontal direction is 48% at the NTSC rate (57% when designed), which is a measurement result exceeding the color reproductivity of the direct view liquid crystal display device added with the conventional 13.3-inch color filter (42% when designed). In this embodiment, a light diffusing member is not used concurrently, and the angle correction effect is brought only from the microprism. Accordingly, a range of a viewing angle at which the chromaticity is uniform falls within a relatively narrow value range from −9 degrees to +12 degrees. However, by concurrently using the diffusion film having appropriate diffusion power, the viewing angle can be extended to a wide range from approximately −20 degrees to +20 degrees under such a condition where the frontal luminance is set at approximately 60%. It is demonstrated that, by adopting the liquid crystal cell 20 in this embodiment in such a way, the viewing angle at which a color reproduction range and color balance are kept uniform is enhanced as compared with the case of using the existing optical film for the purpose of correcting the viewing angle.

Next, the black matrix (BM) 25 to which this embodiment is applied will be described. In the liquid crystal display device to which this embodiment is applied, as the light source 11, for example, a triode fluorescent tube that is a white light source is used. In this triode fluorescent tube, besides spectrum components of the wavelengths of the red (R), green (G) and blue (B), for example, spectrum components including small peaks in wavelengths of orange and cyan are present. It has conventionally been a problem that these spectrum components essentially deteriorate the color reproductivity of the liquid crystal display device. Accordingly, in this embodiment, the pixels of the liquid crystal cell 20 and the black matrix 25 in the liquid crystal cell 20 are redesigned, and a configuration is made such that the wavelength component of the orange or cyan, which hinders the color reproductivity of the pixels, is cut off. Moreover, in addition to this, the microprism structure different in shape for each sub-pixel is formed accurately, thus the color reproductivity in the color filterless liquid crystal display device is enhanced.

Figure 7:
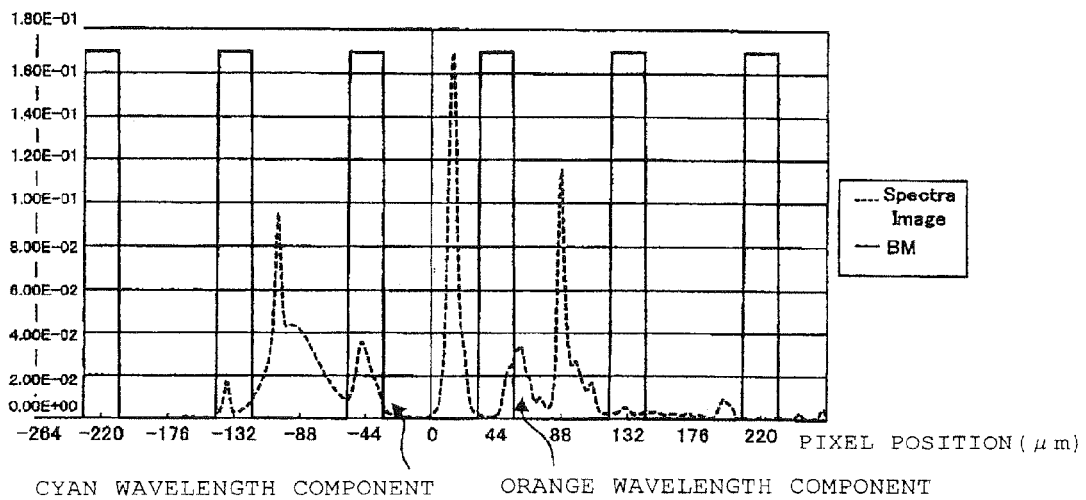
FIGS. 7(a) and 7(b) are graphs, each showing a relationship between a position of a black matrix and a light source spectrum.
Figure 7:
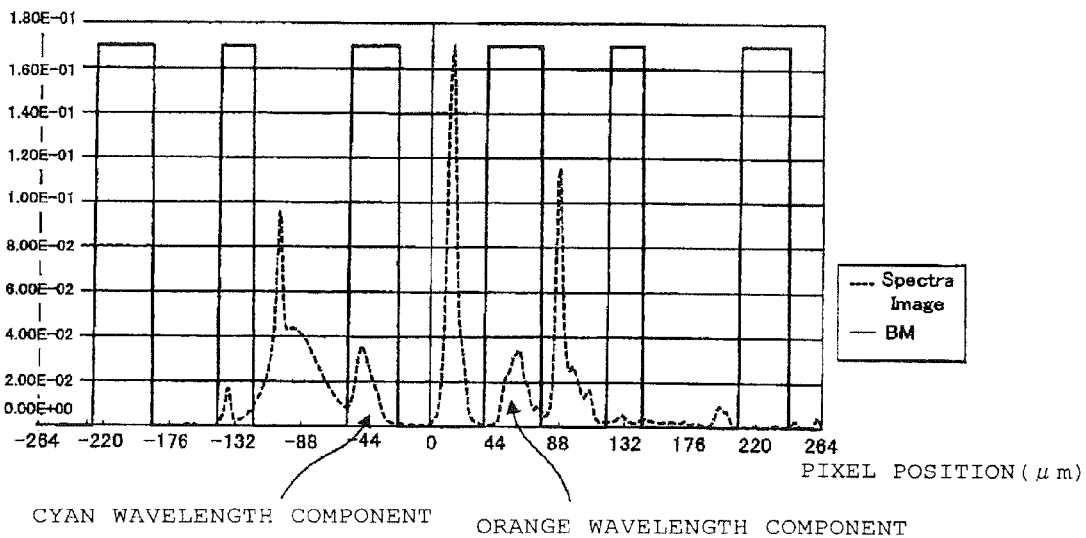

FIGS. 7(a) and 7(b) are graphs, each showing a relationship between a position of the black matrix 25 and a light source spectrum. FIG. 7(a) shows a relationship in the case of adopting a conventional black matrix of an equal interval, and FIG. 7(b) shows a relationship between the position of the black matrix 25 adopted in this embodiment and the light source spectrum. Each abscissa axis represents a pixel position (μm), and each ordinate axis represents an incident light spectrum in the liquid crystal cell 20. As shown in FIG. 7(a), in the case of applying the liquid crystal cell pixels and black matrix of the equal interval to the color filterless liquid crystal display device, for example, the wavelength component of the orange that hinders the color reproductivity cannot be sufficiently cut off, or the wavelength component of the cyan cannot be cut off completely, either. However, in FIG. 7(b), width of each sub-pixel of the liquid crystal cell 20 and width of the black matrix 25 are changed, and optimization design is implemented therefor, thus sufficiently cutting off the wavelength component of the orange and the wavelength component of the cyan. Specifically, in order to sufficiently cut off the orange wavelength component, the width of the black matrix 25 present between the sub-pixels of the green (G) and red (R) in each pixel is reduced by, for example, 5 μm on the green (G) sub-pixel side, and meanwhile, the width is increased by, for example, 20 μm on the red (R) sub-pixel side. Moreover, in order to sufficiently cut off the cyan wavelength component, the width of the black matrix 25 present between the sub-pixels of the blue (B) and green (G) in each pixel is increased by, for example, 10 μm on the green (G) sub-pixel side. In such a way, the pixel widths of the liquid crystal cell 20 and the pixel widths of the black matrix 25 are adjusted, thus making it possible to increase the color reproductivity to approximately 1.15 to 1.2 times that in the case shown in FIG. 7(a) before applying such a width change.

Embodiment 2

Next, as Embodiment 2, an example using a microlens structure will be described. Note that, for similar functions to those in Embodiment 1 described for the microprism structure, the same reference numerals will be used, and here, detailed description thereof will be omitted.

In the conventional color filterless liquid crystal projection device, because of the viewing angle dependencies different for each color and the angle expansion by the condensing function element, a diffusion effect occurs in a process from the liquid crystal cell 20 to a projecting optical element, thus causing a problem of lowering the color reproductivity/resolution, which is caused by color mixture and blur. In order to solve this and to obtain a display image excellent in color reproductivity and clear without blur, a method of correcting in angle the light of every wavelength, which is emitted from the liquid crystal cell, into a substantially parallel light mainly directed to the frontal direction, and making the light incident onto the projecting optical element such as a projection lens is the most effective. For this, a microlens structure, in which two kinds of polymers are used and tilt angles are set respectively in response to incident angles different depending on the wavelengths of the incident components for each sub-pixel, is formed in the liquid crystal cell 20. In such a way, the substantially parallel light mainly directed to the frontal direction can be obtained from all of the sub-pixels. The substantially parallel light mentioned here indicates a luminous flux emitted in an aligning manner to a range of ±10 degrees or less, and desirably ±5 degrees or less, with respect to the frontal direction.

Figure 8:
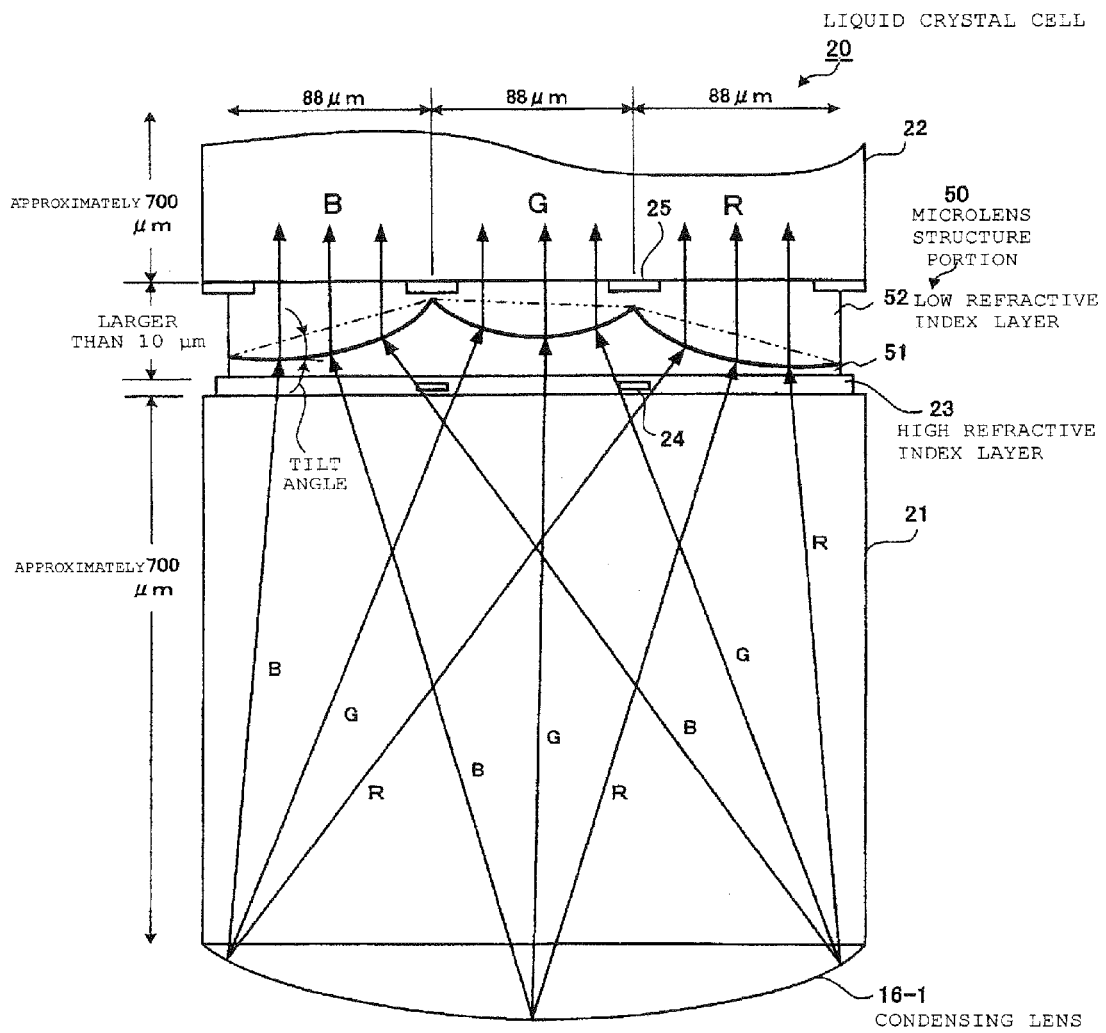
FIG. 8 is a view showing an example of mounting a microlens on the liquid crystal cell.
Figure 9:
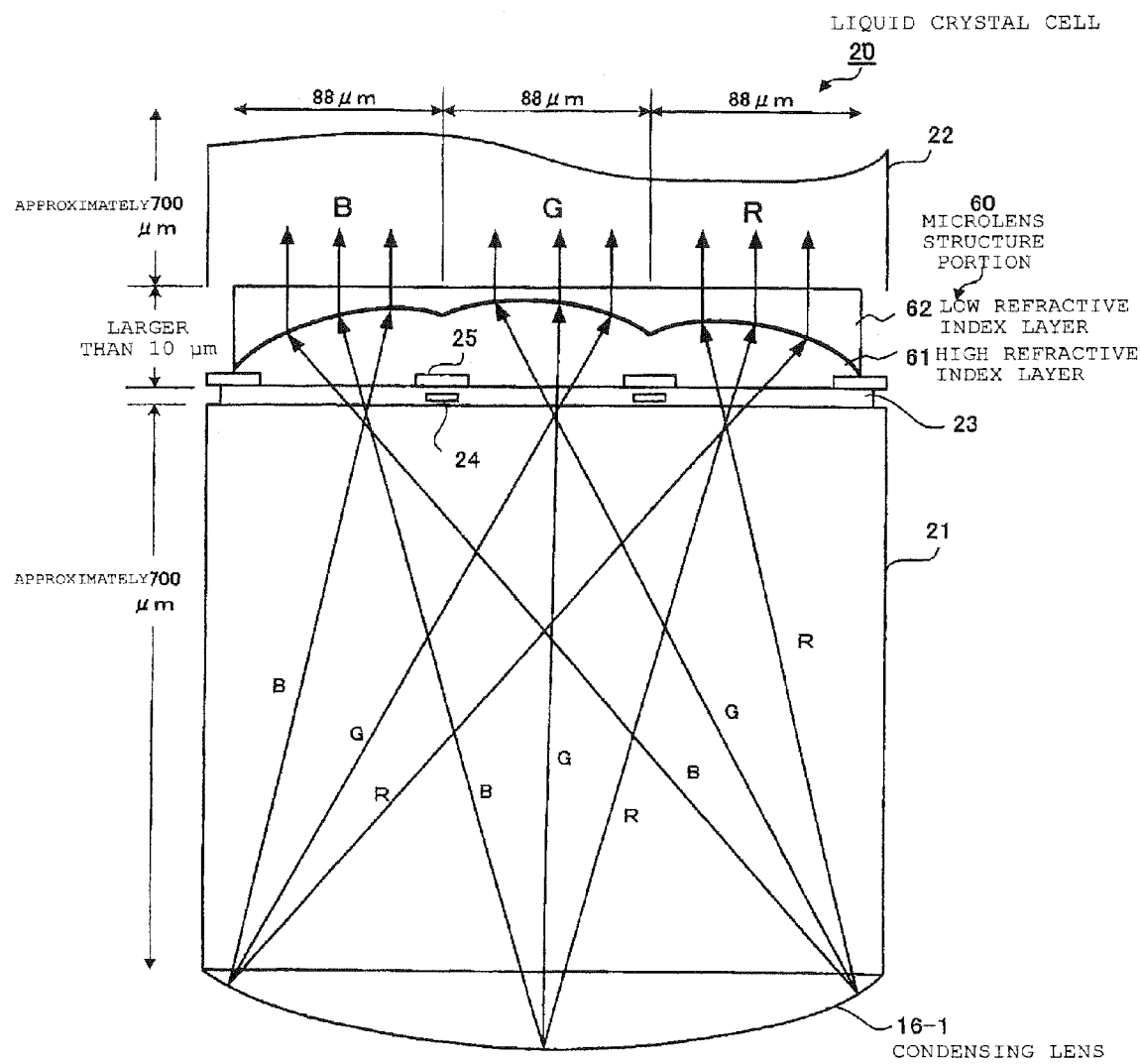
FIG. 9 is a view showing an example of mounting a microlens on the liquid crystal cell.

FIGS. 8 and 9 are views, each showing an example of mounting this microlens on the liquid crystal cell 20. For example, for optical design condensing a light in the vicinities of the liquid crystal layer and black matrix, structures in FIGS. 8 and 9 are determined in response to positional relationships between the black matrix 25 and microlens structure portions 50 and 60. In this embodiment, the angle correction and substantial light paralleling are performed while corresponding in detail to an incident distribution to each sub-pixel, and performance in luminance/chromaticity is enhanced. Besides the color filterless liquid crystal projection device, this structure can also be applied to the color filterless and direct view liquid crystal display device shown in FIG. 1, and a similar effect can be obtained there.

In each of FIGS. 8 and 9, two kinds of polymers in which the sub-pixel cycle is 88 μm and refractive indices are 1.55 and 1.408 are combined, and each of the microlens structure portions 50 and 60 is formed. In FIG. 8, for the microlens structure portion 50, a high refractive index layer 51 is provided on an incident side (bottom side), and a low refractive index layer 52 is provided on an emitting side (top side). A microlens for each sub-pixel, which is formed of these high refractive index layer 51 and low refractive index layer 52, is formed to protrude downward (to swell from the low refractive index layer 52-side). Meanwhile, in FIG. 9, for the microlens structure portion 60, similarly, a high refractive index layer 61 is provided on an incident side (bottom side), and a low refractive index layer 62 is provided on an emitting side (top side). A microlens for each sub-pixel, which is formed of these high refractive index layer 61 and low refractive index layer 62, is formed to protrude upward (to swell from the high refractive index layer 61-side). Moreover, in each of FIGS. 8 and 9, as the cylindrical lens array 16 shown in FIG. 1, a condensing lens 16-1 arranged over the whole of one pixel (three sub-pixels) is illustrated.

Moreover, in these FIGS. 8 and 9, in order to obtain the substantially parallel light mainly directed to the frontal direction from all of the sub-pixels, these microlens structure portions 50 and 60 are formed in a state of being given predetermined tilt angles. There was obtained a result to the effect that the viewing angle characteristics and the color reproductivity in the frontal direction cover the widest range when the tilt angles implemented for the microlenses of the respective sub-pixels become 45 degrees (for the red and blue sub-pixels) and 14 degrees (for the green sub-pixel). If the tilt angles implemented for the microlenses for each sub-pixel are set as described above, thicknesses of the microlens structure portions 50 and 60 become thick, exceeding 10 μm. For example, the thickness becomes approximately 80 to 100 μm in some cases.

In this case, the optimum curvature radius R2' when the refractive indices of the low refractive index layers 52 and 62 are 1 for curvature R1 of the condensing lenses 16-1 shown in the lowermost portions of FIGS. 8 and 9 is used. The curvature radius R2' is represented as: R2'=(⅓)R1 Then, curvature radius R2 of the microlens in the liquid crystal cell 20 is calculated from the following relationship: R2=R2'(nH−nL)/(nH−1) where nH and nL are an absolute refractive index of the high refractive index layers 51 and 61 and an absolute refractive index of the low refractive index layers 52 and 62, both of which form the microlens structure portions 50 and 60 in the liquid crystal cell 20. Note that giving the tilt angles to the microlenses formed in the respective sub-pixels in the liquid crystal cell 20 in each of FIGS. 8 and 9 has the same meaning as in that both microlenses of the red and blue sub-pixels are translated parallel to the green sub-pixel side. Parallel translations of the microlenses for giving desired tilt angles are easily calculated by use of the cycle of the sub-pixels and the curvatures of the microlenses as parameters.

Figure 10:
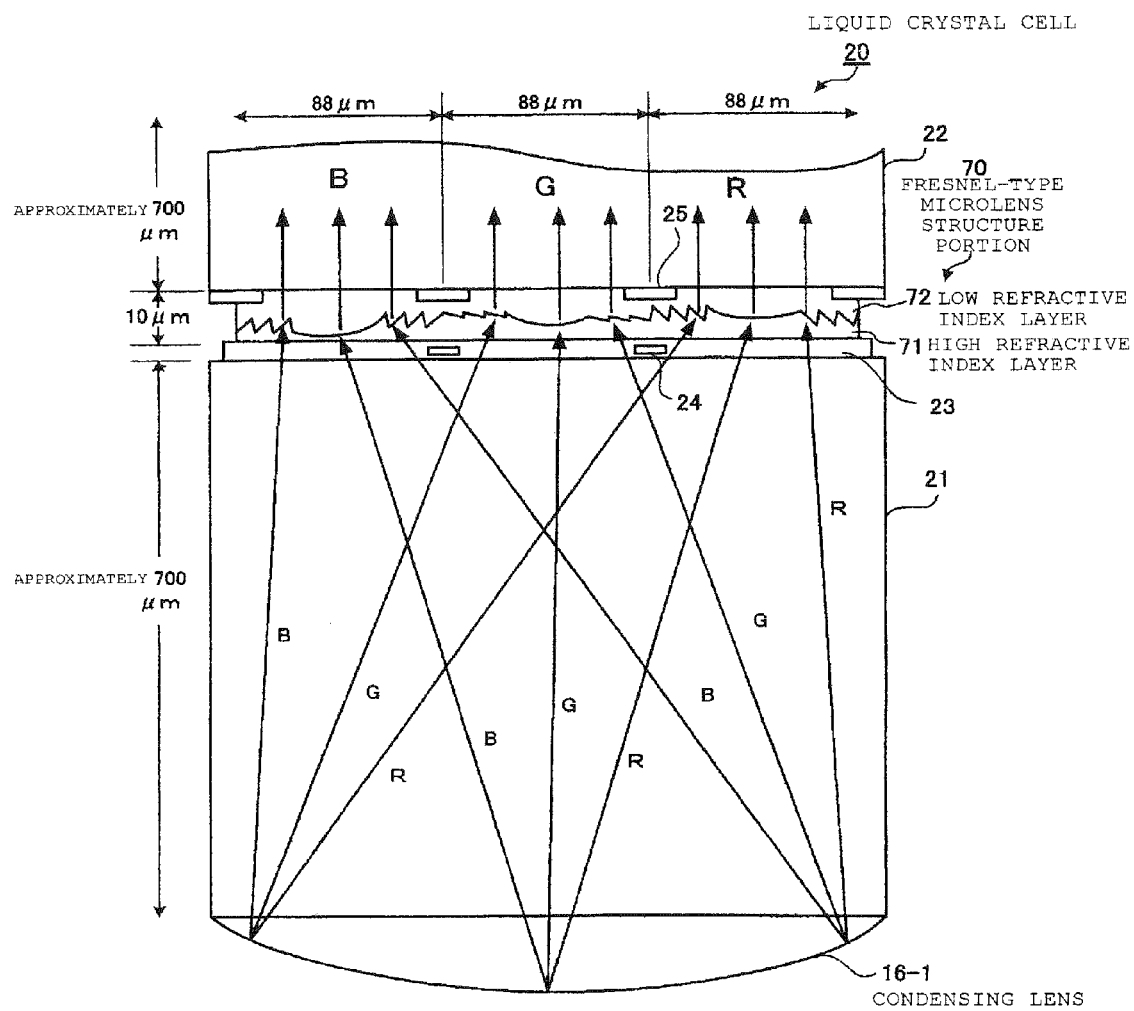
FIG. 10 is a view showing an example of mounting a Fresnel-type microlens shape on the liquid crystal cell.
Figure 11:
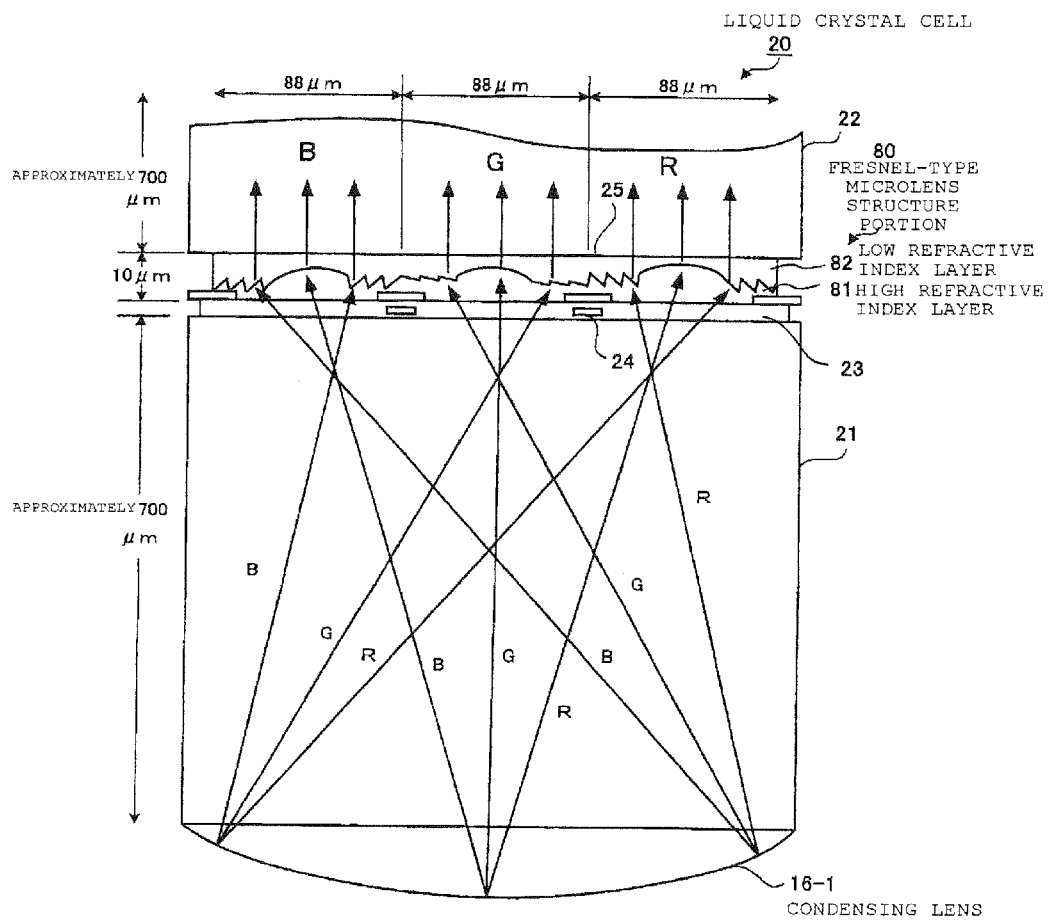
FIG. 11 is a view showing an example of mounting a Fresnel-type microlens shape on the liquid crystal cell.

FIGS. 10 and 11 are views, each showing an example of mounting the Fresnel-type microlens shape on the liquid crystal cell 20. Similarly to the above-mentioned microprism shape, the thinned Fresnel-type microlens shape can also be adopted. The two-layer flat structure of the thinned Fresnel-type microlens shape is adopted, thus making it possible to maintain the evenness of the cell gap and to simplify the manufacturing process. In order to obtain this Fresnel-type microlens shape, two kinds of polymers are used in the liquid crystal cell 20, and a Fresnel-type microlens shape having shapes corresponding to different tilt angles is formed in response to incident angles different depending on the wavelengths of the incident components for each sub-pixel. Concretely, only asymmetry corresponding to the tilt angles is given, and accordingly, it is made possible to thin the shape. In this case also, the substantially parallel light mainly directed to the frontal direction can be obtained from all of the sub-pixels.

Here, similarly to FIGS. 8 and 9, two kinds of polymers in which the cycle of the sub-pixels is 88 μm and the refractive indices are 1.55 and 1.408 are combined, and Fresnel-type microlens structure portions 70 and 80 are formed. In FIG. 10, for the Fresnel-type microlens structure portion 70, a high refractive index layer 71 is provided on an incident side (bottom side), and a low refractive index layer 72 is provided on an emitting side (top side). A Fresnel-type microlens for each sub-pixel, which is formed of these high refractive index layer 71 and low refractive index layer 72, is formed to protrude downward (to swell from the low refractive index layer 72-side). Meanwhile, in FIG. 11, for the Fresnel-type microlens structure portion 80, similarly, a high refractive index layer 81 is provided on an incident side (bottom side), and a low refractive index layer 82 is provided on an emitting side (top side). A Fresnel-type microlens for each sub-pixel, which is formed of these high refractive index layer 81 and low refractive index layer 82, is formed to protrude upward (to swell from the high refractive index layer 81-side). Due to optical design in which a light is condensed in the vicinities of the liquid crystal layer 23 and the black matrix 25, which are shown in the drawings, it is desirable to appropriately select the structures in FIGS. 10 and 11 in response to positional relationships between the black matrix 25 and the Fresnel-type microlens structure portions 70 and 80. The angle correction and the substantial light paralleling are performed while corresponding in detail to an incident distribution to each sub-pixel, and performance in luminance/chromaticity is enhanced. Besides the color filterless liquid crystal projection device, these structures can also be applied to the color filterless and direct view liquid crystal display device, and a similar effect can be obtained there.

Note that, as another embodiment, it is also possible to form a diffraction grating structure in the liquid crystal cell 20. Specifically, a diffraction grating structure of a triangular cross-sectional shape is formed in the liquid crystal cell 20 by use of two kinds of polymers. Similarly to the Fresnel-type microprism structure described with reference to FIG. 3, a diffraction grating with cycles different depending on the wavelengths of the incident components for each sub-pixel is formed, and an emission distribution including diffraction components mainly directed to the frontal direction is obtained from all of the sub-pixels. Furthermore, in the microprism or diffraction grating built in the liquid crystal cell 20, a shape thereof is changed into a shape in which variations are added to the cyclic structure depending on positions in the respective sub-pixels. Thus, a fine adjustment for the angle correction and the diffusion function can be performed in response to the spectrum distributions of the intensities of the incident light onto the respective sub-pixels, and performance enhancements in the luminance, the chromaticity and the viewing angle can be achieved.

Next, a method of manufacturing the microprism/microlens built in the liquid crystal cell 20 will be described.

Figure 12:
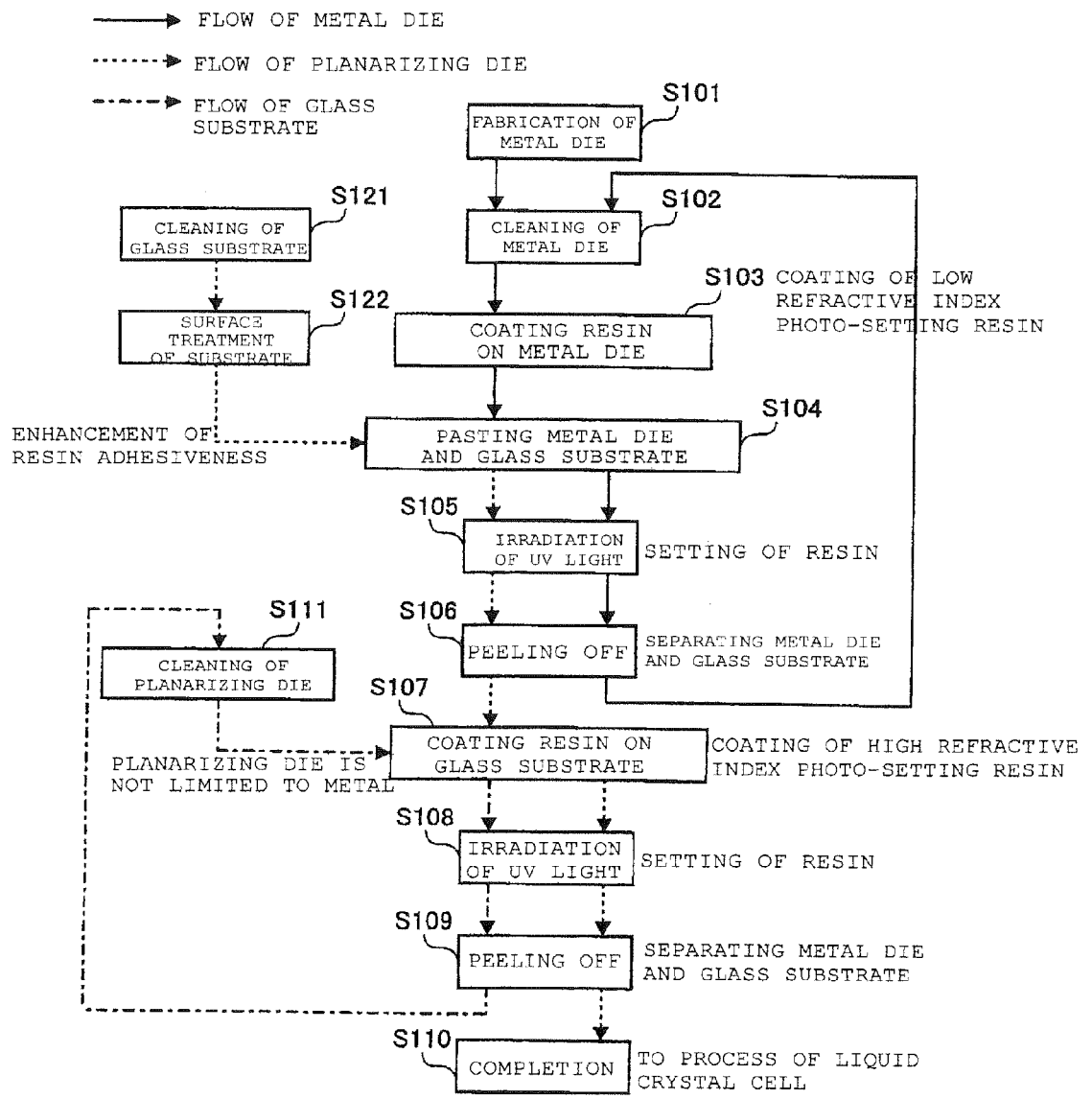
FIG. 12 is a flowchart showing a process of a method of manufacturing the microprism/microlens.
Figure 13:
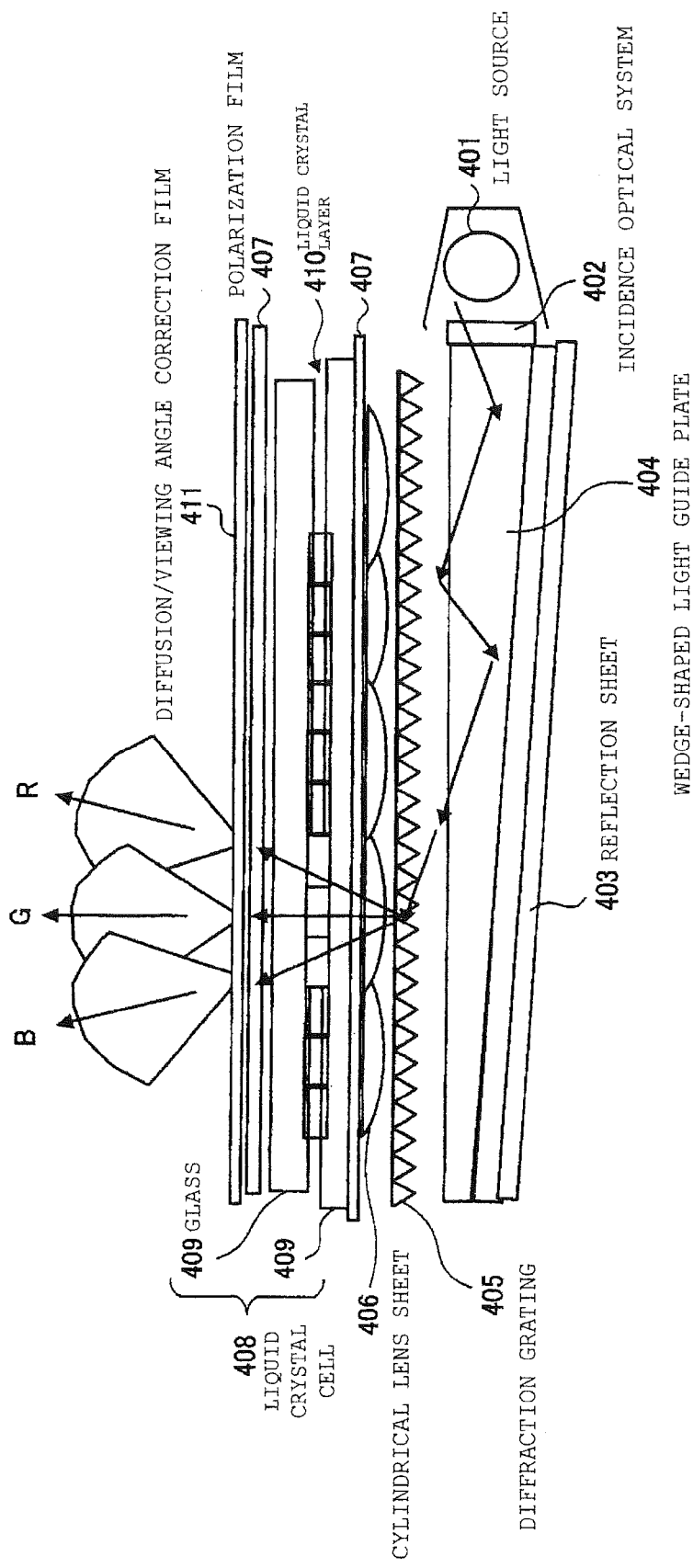
FIG. 13 is a view showing, as an example of the color filterless liquid crystal display device, a configuration of a conventional color filterless and direct view liquid crystal display device using a spectral element.

FIG. 12 is a flowchart showing a process of the method of manufacturing the microprism/microlens. First, based on design values, a lens shape and the like are cut on a surface of a metal die material, and thus a metal die is fabricated (Step 101). As a die material, metal such as Cu, Al and Ni may be used, or silicon elastomer and the like may be used. After cleaning this fabricated metal die (Step 102), low refractive index photo-setting resin, for example, fluororesin is coated thereon (Step 103). Meanwhile, after cleaning the glass substrate 22 (Step 121), a surface treatment for enhancing adhesiveness to the resin is implemented for a surface of the glass substrate 22 (Step 122). In Step 104, the metal die on which the resin is coated in Step 103 and the glass substrate 22 for which the surface treatment is implemented in Step 122 are pasted together (Step 104), and are irradiated with an ultraviolet ray to set the low refractive index resin (Step 105). Next, the glass substrate 22 to which the resin is adhered is peeled off from the metal die (Step 106), and thus the fabrication of the microprism/microlens is completed. Furthermore, in this embodiment, on the glass substrate 22 on which the microprism/microlens structure is formed of the low refractive index resin, high refractive index photo-setting resin, for example, acrylic resin is coated (Step 107). Then, a planarizing die which is prepared separately and cleaned in Step 111 is pasted on the resultant, and again, an ultraviolet ray is irradiated thereon, and the resin is set (Step 108). The planarizing die is not limited to the metal. Finally, the planarizing die is peeled off from the glass substrate 22 on which the planarized microprism/microlens structure formed of the two kinds of resins is formed (Step 109). Thus, the manufacture of the microprism/microlens is ended (Step 110). Thereafter, a creation process of the liquid crystal cell 20 is executed.

The manufactured microprism/microlens is pasted to each sub-pixel in the liquid crystal cell 20 in a state of meeting high accuracy required. For this position alignment, a positioning method using an "alignment mark" is utilized. For example, by use of ultraviolet-setting resin and a metal die, the "alignment mark" made of a cross mark having a width of 150 µm is formed on the metal die. Then, resin is coated on this metal die, and further, the metal die is aligned with the glass substrate 22 having an "alignment mark" similar to that of the metal die by use of a high-resolution camera, and the resin is set by an ultraviolet ray. In such a way, for example, position alignment is realized at accuracy of ±15 µm or less per 200 mm.

As described in detail, according to the respective embodiments, in the color liquid crystal display device in which the incident angles and wavelengths of the light made incident onto the sub-pixels corresponding to the respective colors of the R (red), G (green) and B (blue) are different for each sub-pixel, the microprism structure or the like optimized for each sub-pixel corresponding to each color is introduced. Thus, the emission angles of the light of the respective colors of R, G and B from the liquid crystal cell 20 can be corrected to the emitting light distribution similarly symmetric with respect to the frontal direction as a center. Moreover, the microlens structure optimized for each sub-pixel corresponding to each color is introduced, thus making it possible to substantially parallel the emission angles of the light of the respective colors R, G B from the liquid crystal cell 20 while directing the light to, for example, the frontal direction. Furthermore, another optical function element, for example, an element having a light diffusion function or the like is interposed in the liquid crystal cell 20, thus making it possible to provide a display device realizing a display image having a wide-range color reproductivity, a wide viewing angle, and clearness without blur.

The color filterless liquid crystal display device is a technique potentially having high color reproductivity (at the NTSC rate) because the device takes in the wavelength component suitable for the sub-pixel corresponding to each color. The microprism/microlens as mentioned above is introduced, and thus, for example, in the case of the direct view liquid crystal display device, it is possible to enhance the color reproductivity in the frontal direction, which is important in practical use. Moreover, the viewing angle wide and symmetric with respect to the frontal direction as a center is made possible. In an example of the optimum prism design value, the color reproductivity in the frontal direction is 57% at the NTSC rate, covers a range of ±10 degrees even without a scattering function, and the uniform chromaticity is obtained. A light diffusing member in response to a desired viewing angle distribution is combined with this, or an appropriate light diffusing effect is provided concurrently to the prism itself, thus making it possible to fabricate a direct view color liquid crystal display device which is high luminance and has a distribution of an emitted light with uniform chromaticity. Moreover, in the liquid crystal projection device, the light can be subjected to the angle correction to the parallel light arrayed to the frontal direction.

Furthermore, in this embodiment, the prism/microlens structure is introduced into the liquid crystal cell 20, and thus the liquid crystal display device without any parallax is provided.

Still further, when the prism/lens shape is transferred from the metal die to the glass substrate for the liquid crystal cell, not a heating process but the light irradiation process is used, and thus the microprism/microlens structure without causing any tolerance from the design value due to thermal expansion can also be provided.

As an example of making full use of the present invention, besides the color filterless and direct view liquid crystal display device, a color display device such as a color filterless liquid crystal projection device, and an optical element for use in these image display devices are given.

Although advantageous embodiments of the present invention have been described in detail, it should be understood that various changes, substitutions and alternations can be made therein without departing from spirit and scope of the inventions as defined by the appended claims.

What is claimed is:

1. A method of forming liquid crystal cell for a color display device, the method comprising:
   forming a liquid crystal layer and a prism structure between top and bottom substrates, the liquid crystal layer including thin film transistors (TFT) formed therein, wherein forming the prism structure further comprises:
   forming a lens shaped die from a first die material;
   coating a low refractive index photo-setting resin on the lens shaped die;

pasting the lens shaped die to the top substrate;
irradiating the coated low refractive index photo-setting resin so as to set the low refractive index resin on a surface of the top substrate and form a low refractive index layer;
removing the lens shaped die from the low refractive index layer set on the top substrate;
coating a high refractive index photo-setting resin on the low refractive index layer by use of a planarizing die;
irradiating the coated high refractive index photo-setting resin so as to set the high refractive index resin and form a high refractive index layer; and
removing the planarizing die from the high refractive index layer set on the low refractive index layer;
wherein the first die material comprises one of: a metal material and a silicon elastomer material.

2. The method of claim 1, wherein the first die material comprises one of: copper, aluminum, and nickel.

3. A method of forming liquid crystal cell for a color display device, the method comprising:
forming a liquid crystal layer and a prism structure between top and bottom glass substrates, the liquid crystal layer including thin film transistors (TFT) formed therein, wherein forming the prism structure further comprises:
forming a lens shaped die from a first die material;
coating a low refractive index photo-setting resin on the lens shaped die;
pasting the lens shaped die to the top substrate;
irradiating the coated low refractive index photo-setting resin so as to set the low refractive index resin on a surface of the top substrate and form a low refractive index layer;
removing the lens shaped die from the low refractive index layer set on the top substrate;
coating a high refractive index photo-setting resin on the low refractive index layer by use of a planarizing die;
irradiating the coated high refractive index photo-setting resin so as to set the high refractive index resin and form a high refractive index layer;
removing the planarizing die from the high refractive index layer set on the low refractive index layer; and
surface treating the glass top substrate prior pasting the low refractive index coated lens shaped die thereto, so as to enhance adhesiveness of the low refractive index resin to the glass top substrate.

4. A method of forming liquid crystal cell for a color display device, the method comprising:
forming a liquid crystal layer and a prism structure between top and bottom substrates, the liquid crystal layer including thin film transistors (TFT) formed therein, wherein forming the prism structure further comprises:
forming a lens shaped die from a first die material;
coating a low refractive index photo-setting resin on the lens shaped die;
pasting the lens shaped die to the top substrate;
irradiating the coated low refractive index photo-setting resin so as to set the low refractive index resin on a surface of the top substrate and form a low refractive index layer;
removing the lens shaped die from the low refractive index layer set on the top substrate;
coating a high refractive index photo-setting resin on the low refractive index layer by use of a planarizing die, wherein the high refractive index layer has a refractive index of about 1.55;
irradiating the coated high refractive index photo-setting resin so as to set the high refractive index resin and form a high refractive index layer; and
removing the planarizing die from the high refractive index layer set on the low refractive index layer; wherein the high refractive index layer and the low refractive index layer have different shapes for each of sub-pixels corresponding to respective colors of red (R), green (G) and blue (B), and wherein an uppermost portion of the high refractive index layer for each of the R, G and B sub-pixels has a curved shape.

5. A method of forming liquid crystal cell for a color display device, the method comprising:
forming a liquid crystal layer and a prism structure between top and bottom substrates, the liquid crystal layer including thin film transistors (TFT) formed therein, wherein forming the prism structure further comprises:
forming a lens shaped die from a first die material;
coating a low refractive index photo-setting resin on the lens shaped die, wherein the low refractive index layer has a refractive index of about 1.408;
pasting the lens shaped die to the top substrate;
irradiating the coated low refractive index photo-setting resin so as to set the low refractive index resin on a surface of the top substrate and form a low refractive index layer;
removing the lens shaped die from the low refractive index layer set on the top substrate;
coating a high refractive index photo-setting resin on the low refractive index layer by use of a planarizing die;
irradiating the coated high refractive index photo-setting resin so as to set the high refractive index resin and form a high refractive index layer; and
removing the planarizing die from the high refractive index layer set on the low refractive index layer; wherein the high refractive index layer and the low refractive index layer have different shapes for each of sub-pixels corresponding to respective colors of red (R), green (G) and blue (B), and wherein an uppermost portion of the high refractive index layer for each of the R, G and B sub-pixels has a curved shape.

* * * * *